US012563289B2

(12) United States Patent
Shingu et al.

(10) Patent No.: US 12,563,289 B2
(45) Date of Patent: Feb. 24, 2026

(54) IMAGING DEVICE AND CONTROL METHOD OF IMAGING DEVICE

(71) Applicant: Panasonic Intellectual Property Management Co., Ltd., Osaka (JP)

(72) Inventors: Yasuhiro Shingu, Osaka (JP); Koki Arimi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 278 days.

(21) Appl. No.: 18/371,359

(22) Filed: Sep. 21, 2023

(65) Prior Publication Data

US 2024/0107161 A1      Mar. 28, 2024

(30) Foreign Application Priority Data

Sep. 27, 2022    (JP) ................................. 2022-153986
Jun. 26, 2023    (JP) ................................. 2023-104128

(51) Int. Cl.
*H04N 23/667* (2023.01)
*H04N 23/55* (2023.01)
(Continued)

(52) U.S. Cl.
CPC ........... *H04N 23/667* (2023.01); *H04N 23/55* (2023.01); *H04N 23/634* (2023.01); *H04N 23/64* (2023.01); *H04N 23/675* (2023.01)

(58) Field of Classification Search
CPC .... H04N 23/667; H04N 23/55; H04N 23/634; H04N 23/64; H04N 23/675; H04N 23/75
See application file for complete search history.

(56) References Cited

U.S. PATENT DOCUMENTS 4,673,277 A * 6/1987 Someya ................. G03B 7/087
                                                    396/291
4,792,823 A * 12/1988 Fujino ..................... G03B 7/20
                                                    396/257
(Continued)

FOREIGN PATENT DOCUMENTS

JP          2012-212078 A      11/2012
JP          2019-205139 A      11/2019
(Continued)

*Primary Examiner* — Abdelaaziz Tissire
(74) *Attorney, Agent, or Firm* — Renner, Otto, Boisselle & Sklar, LLP

(57) ABSTRACT

An imaging device includes: an imaging element having an imaging plane for light from an object to enter; a switching mechanism that switches a first transmissibility state and a second transmissibility state therebetween by varying transmissibility for the light entering the imaging plane using optical filters, a processor that controls the imaging element and the switching mechanism; and a memory that stores therein instructions to be executed by the processor. The instructions include: determining whether the first transmissibility state or the second transmissibility state is established; in the first transmissibility state, acquiring a first setting range that indicates an aperture value or a focus settable in the first transmissibility state; in the second transmissibility state, acquiring a second setting range that indicates an aperture value or a focus settable in the second transmissibility state; and limiting the aperture value or the focus based on the first or second setting range.

19 Claims, 19 Drawing Sheets

(51) Int. Cl.
  *H04N 23/60*    (2023.01)
  *H04N 23/63*    (2023.01)
  *H04N 23/67*    (2023.01)

(56)    References Cited

U.S. PATENT DOCUMENTS

| | | | | |
|---|---|---|---|---|
| 2008/0106805 A1* | 5/2008 | Aiba | ....................... | H04N 23/55 |
| | | | | 359/723 |
| 2011/0122252 A1* | 5/2011 | Choi | ....................... | G03B 11/00 |
| | | | | 348/E5.09 |
| 2012/0249895 A1 | 10/2012 | Kaifu | | |
| 2017/0180631 A1* | 6/2017 | Furuta | .................. | H04N 23/663 |
| 2018/0027163 A1* | 1/2018 | Uchida | .................. | H04N 23/75 |
| | | | | 348/361 |
| 2021/0200059 A1* | 7/2021 | Iinuma | ................... | G02B 5/205 |
| 2022/0224814 A1* | 7/2022 | Yoshimuta | ............. | H04N 23/75 |

FOREIGN PATENT DOCUMENTS

| | | | |
|---|---|---|---|
| WO | 2021/200141 A1 | 10/2021 | |
| WO | 2021/200183 A1 | 10/2021 | |

* cited by examiner

IMAGING DEVICE AND CONTROL METHOD OF IMAGING DEVICE

CROSS REFERENCE TO RELATED APPLICATION

This application claims benefit of priority to Japanese Patent Application 2022-153986, filed Sep. 27, 2022 and Japanese Patent Application 2023-104128, filed Jun. 26, 2023, the entire content of which is incorporated herein by reference.

BACKGROUND

Technical Field

The present disclosure relates to an imaging device and a control method of an imaging device.

Background Art

For example, JP2012212078A discloses an imaging device that executes light dimming control by controlling the transmissibility for the light passing through a cell. The imaging device described in JP2012212078A includes an imaging element and an optical device. The optical device includes the cell, a transmissibility variable part, and a transmissibility fixed part. The cell includes a housing layer between a first transparent substrate disposed on the light incident side and a second transparent substrate that faces the first transparent substrate and that is disposed on the light exiting side. The transmissibility variable part is disposed in a first region of the housing layer, and can vary the light transmissibility thereof in a predetermined range. The transmissibility fixed part is disposed in a second region that is different from the first region when the transmissibility fixed part is seen in the direction for the light to enter, and has a higher light transmissibility than that of the transmissibility variable part.

SUMMARY

It has recently been demanded that an imaging device limits its aperture value or its focus in response to switching of the transmissibility state for light using an optical filter(s).

An object of the present disclosure is therefore to provide an imaging device that limits its aperture value or its focus in response to switching of the transmissibility state for light using an optical filter(s), and a control method of the imaging device.

To solve the above problem, an imaging device in one aspect of the present disclosure includes;

an imaging element having an imaging plane for light from an object to enter;

a switching mechanism that switches a first transmissibility state and a second transmissibility state different from the first transmissibility state, therebetween by varying the transmissibility for the light entering the imaging plane, using optical filters;

a processor that controls the imaging element and the switching mechanism; and a memory that stores therein instructions to be executed by the processor, the instructions include:

determining whether the first transmissibility state or the second transmissibility state is established;

in the case where the first transmissibility state is established, acquiring a first setting range that indicates an aperture value or a focus settable in the first transmissibility state;

in the case where the second transmissibility state is established, acquiring a second setting range that indicates an aperture value or a focus settable in the second transmissibility state; and limiting the aperture value or the focus based on the first setting range or the second setting range.

A control method of an imaging device in one aspect of the present disclosure is a control method of an imaging device including an imaging element having an imaging plane for light from an object to enter, and a switching mechanism that switches a first transmissibility state and a second transmissibility state different from the first transmissibility state therebetween by varying the transmissibility of the light entering the imaging plane, using optical filters, and the control method includes:

determining whether the first transmissibility state or the second transmissibility state is established;

in the case where the first transmissibility state is established, acquiring a first setting range that indicates an aperture value or a focus settable in the first transmissibility state;

in a case where the second transmissibility state is established, acquiring a second setting range that indicates an aperture value or a focus settable in the second transmissibility state; and limiting the aperture value or the focus based on the first setting range or the second setting range.

According to the present disclosure, an imaging device that limits its aperture value or its focus in response to switching of the transmissibility state for light using optical filters, and a control method of an imaging device can be provided.

Figure 1:
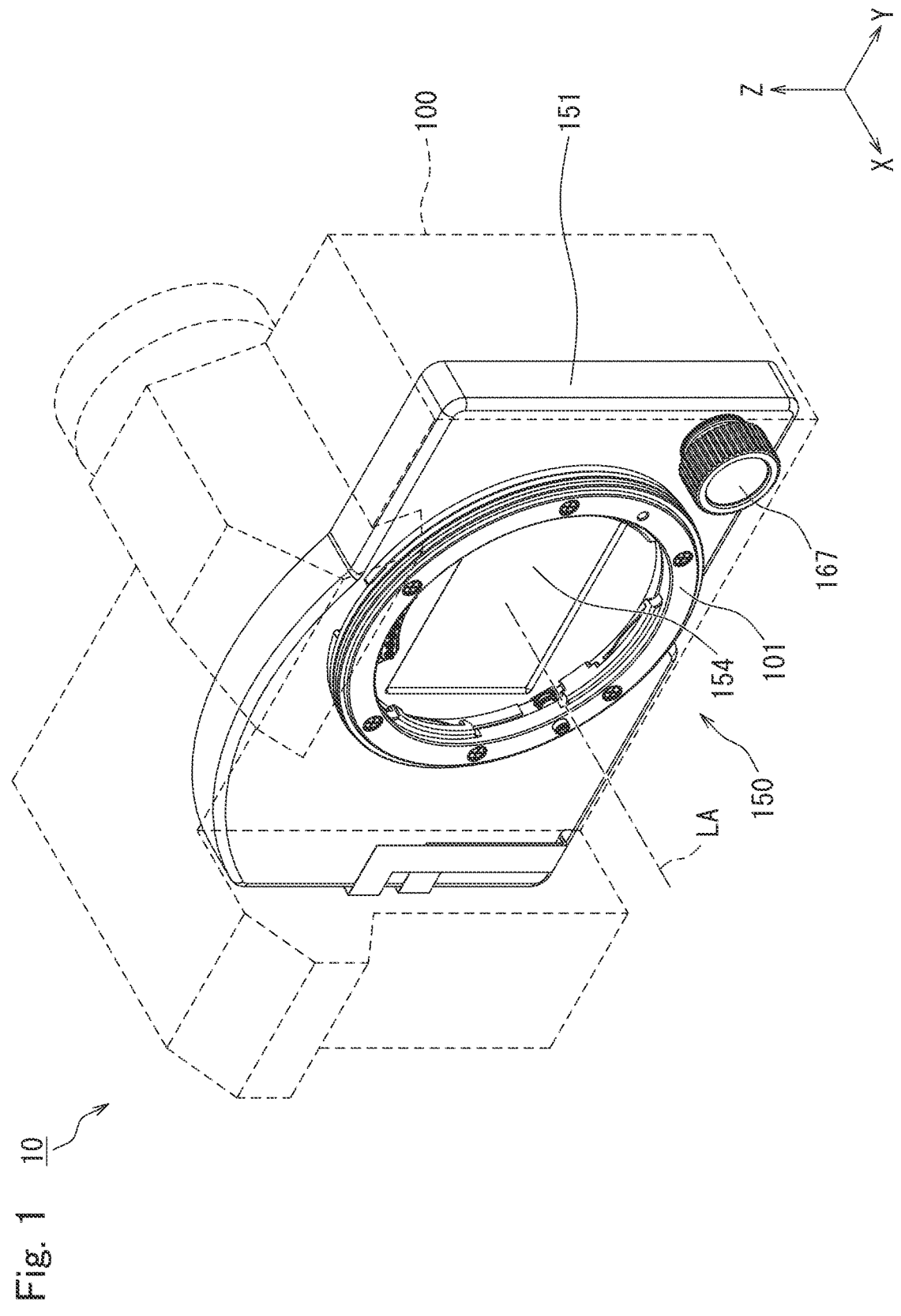
FIG. 1 is a schematic front perspective diagram of an imaging device according to a first embodiment of the present disclosure.

DETAILED DESCRIPTION (Details of Reaching Present Disclosure)

An imaging device varies the light transmissibility using an optical filter such as that of clear glass, ND glass, or electronic neutral density (ND). For example, an optical filter is movably disposed in front of an imaging plane of an imaging element and, when an object is imaged, the transmissibility state of the light is switched by switching the optical filter that is positioned in front of the imaging plane of the imaging element.

Such an optical filter may have a blemish or a hole on the filter surface thereof, that is formed in the manufacturing stage thereof. For example, for a clear glass, an ND glass, and an electronic ND filters, each of their glass surfaces may be machine-polished to form the glass as a thin film. A blemish or a hole may be formed on the glass surface due to the machine polishing.

Some types of electronic ND filter are each configured to sandwich a liquid crystal material between plural glass pieces. When machine polishing is executed for the glass piece of such an electronic ND filter, a load is applied to the liquid crystal material by the processing pressure and the clearance inside the liquid crystal material may become uneven.

A foreign object may adhere to the filter surface of the optical filter.

In the case where an optical filter has a blemish, a hole, or a foreign object present thereon, a problem arises that the blemish, the hole, or the foreign object appears in the image or the video image that is imaged, depending on the setting of the aperture value or the focus. For example, the light flux of the light entering from the object becomes smaller as the aperture value becomes greater, and the appearance of the blemish, the hole, or the foreign object present on the optical filter, into a still image or a moving image therefore becomes more conspicuous.

The inventor(s) actively studied and found out a configuration that limits the aperture value or the focus in response to switching of the transmissibility state for light, using optical filters, to reach the present disclosure.

Embodiments will be described below in detail with reference to the drawings as necessary. Unnecessarily detailed description may however not be made. For example, detailed description for an item already known well and redundant description for substantially identical configurations may not be made. This is to avoid causing the following description to be unnecessarily redundant and to facilitate understanding of those skilled in the art.

The inventor(s) has/have provided the accompanying drawings and the following description for those skilled in the art to fully understand the present disclosure, and does/do not intend to limit the subject matter described in the claims, using these.

An imaging device and a control method of an imaging device according to the first embodiment of the present invention will be described with reference to the drawings.

First Embodiment (Overall Configuration)

FIG. 1 is a schematic front perspective diagram of the imaging device according to the first embodiment of the present disclosure. An X-Y-Z orthogonal coordinate system depicted in the drawing is to facilitate understanding of the embodiments of the present disclosure, and does not limit the embodiments of the present disclosure. The X-axis direction is the front-back direction of the imaging device, the Y-axis direction is the right-left direction thereof, and the Z-axis direction is the height direction thereof. It is assumed that the side on which an object is present when the shooting is executed is the front side of the imaging device.

As depicted in FIG. 1, the imaging device 10 according to the first embodiment of the present disclosure is a digital single-lens camera. The imaging device 10 includes a camera body 100. A body mount 101 is disposed on the camera body 100. An interchangeable lens unit 200 is detachably attached to the body mount 101. The imaging device 10 includes a filter module 150 that switches the transmissibility state for light.

Figure 2:
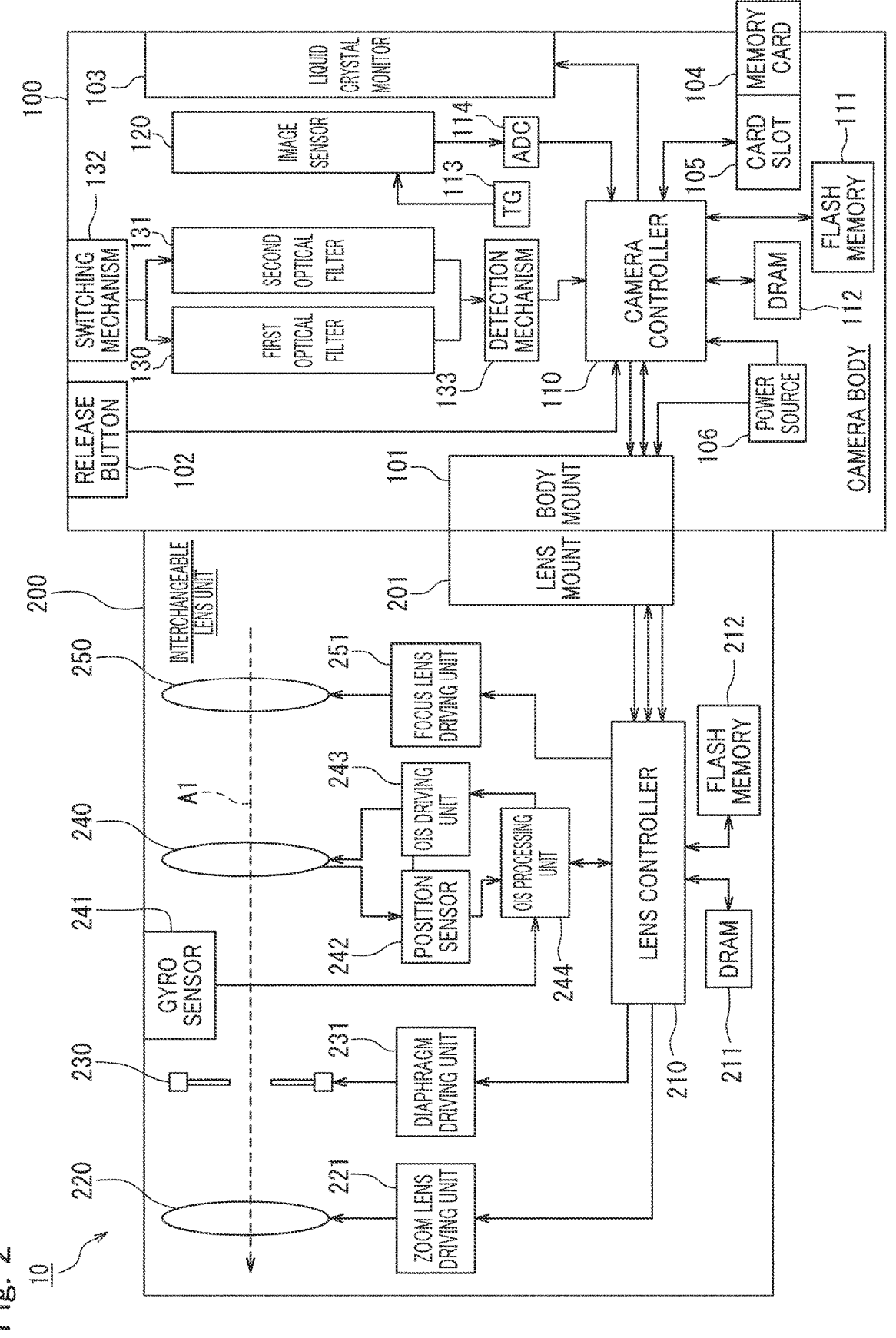
FIG. 2 is a block diagram depicting a schematic configuration of the imaging device according to the first embodiment of the present disclosure.

FIG. 2 is a block diagram depicting a schematic configuration of the imaging device according to the first embodiment of the present disclosure.

As depicted in FIG. 2, the camera body 100 includes a camera controller 110, a flash memory 111, and an image sensor 120 that is one example of the imaging element.

The camera controller 110 controls the constituent elements such as the image sensor 120 in response to instructions from various types of button such as a release button 102 and various types of operational member, and thereby controls the operation of the overall imaging device 10. For example, the camera controller 110 transmits a vertical synchronization signal to a timing generator (TG) 113 and produces an exposure synchronization signal based on the vertical synchronization signal. The camera controller 110 periodically transmits the produced exposure synchronization signal to the interchangeable lens unit 200 through the body mount 101. The camera controller 110 thereby controls the interchangeable lens unit 200 to synchronize with the timing for exposure.

The camera controller 110 includes a processor, and the processor executes instructions and predetermined functions are thereby realized. For example, the camera controller 110 may be realized by each of various types of processor such as a CPU, an MPU, a GPU, a DSU, an FPGA, and an ASIC. The processor may include a dedicated electronic circuit that is designed to realize the predetermined functions. The camera controller 110 may include one or plural processor (s). The camera controller 110 uses a DRAM 112 as a work memory during a control operation or an image processing operation.

The flash memory 111 stores therein the instructions to be executed by the camera controller 110. For example, the flash memory 1/1 stores therein programs, parameters, data, and the like that are used during the control by the camera controller 110. The camera controller 110 executes various types of control operation based on the programs, the parameters, the data, and the like that are stored in the flash memory 111.

The image sensor 120 images an object image entering through the interchangeable lens unit 200 to produce image data. The image data produced by the image sensor 120 is digitalized by an analog-digital conversion circuit (ADC) 114. Predetermined image processing is applied by the camera controller 110 to the image data that is digitalized by the analog-digital conversion circuit. The image data after undergoing the image processing by the camera controller 110 is displayed on a liquid crystal monitor 103. The image sensor 120 is, for example, a charge coupled device (CCD) sensor or a complementary metal oxide semiconductor (CMOS) sensor.

The image sensor 120 operates at the timings controlled by the timing generator 113. Examples of the operation of the image sensor 120 include an imaging operation for a still image, an imaging operation for a through-the-lens image, a data transfer operation, and an electronic shutter operation, and the like.

The camera body 100 includes a card slot 105 to which a memory card 104 is detachably connected, and a power source 106.

The card slot 105 is configured to be able to electrically and mechanically connect thereto the memory card 104. The memory card 104 is an external memory that internally includes a storage element such as a flash memory. The memory card 104 stores therein various types of data including the image data that is image-processed by the camera controller 110. The various types of data stored in the memory card 104, for example, are read by the camera controller 110 through the card slot 105 and are displayed on the liquid crystal monitor 103.

The power source 106 supplies electric power to drive the imaging device 10. The power source 106, for example, may be a dry battery or a rechargeable battery, or may be a component that supplies, to the imaging device 10, electric power externally supplied by a power source cord. When the power source 106 is turned on, the camera controller 110 supplies electric power to parts of the camera body 100. The camera controller 110 also supplies electric power to the interchangeable lens unit 200 through the body mount 101. The electric power is supplied to parts of the interchangeable lens unit 200 by a lens controller 210 described later.

The body mount 101 is configured to be mechanically and electrically connectable to a lens mount 201 included in the interchangeable lens unit 200. The body mount 101 is configured to be able to transmit and receive data between the camera body 100 and the interchangeable lens unit 200 through the lens mount 201. The body mount 101 transmits the exposure synchronization signal and other control signals that are received from the camera controller 110, to the lens controller 210 through the lens mount 201. The body mount 101 transmits, to the camera controller 110, the signal received from the lens controller 210 through the lens mount 201.

The camera body 100 includes a first optical filter 130, a second optical filter 131, a switching mechanism 132, and a detection mechanism 133. In this embodiment, the first optical filter 130, the second optical filter 131, the switching mechanism 132, and the detection mechanism 133 constitute a first filter module 150.

The first optical filter 130 and the second optical filter 131 are filters each used to vary the light transmissibility. For example, when an object is imaged, the transmission state of light that enters an imaging plane 120*a* of the image sensor 120 is switched by using the first optical filter 130 and the second optical filter 131 being switched therebetween. In this embodiment, the state where the light transmissibility is varied using the first optical filter 130 is referred to as "first transmissibility state", and the state where the light transmissibility is varied using the second optical filter 131 is referred to as "second transmissibility state".

In this embodiment, the first optical filter 130 is an electronic ND filter capable of varying the transmissibility thereof for light such as, for example, a liquid crystal filter. The light transmissibility of the first optical filter 130 is varied by varying a driving voltage to be applied to the first optical filter 130. The second optical filter 131 is a filter that is not capable of varying the light transmissibility thereof, that is, whose transmissibility is fixed, such as, for example, clear glass.

The switching mechanism 132 varies the light transmissibility entering the imaging plane 120*a* of the image sensor 120, using the first optical filter 130 or the second optical filter 131 and thereby switches the first transmissibility state and the second transmissibility state that is different from the first transmissibility state, therebetween. The switching mechanism 132 uses the first optical filter 130 and the second optical filter 131 switching therebetween and thereby switches the first transmissibility state and the second transmissibility state therebetween.

The switching mechanism 132 includes a driving mechanism that causes the first and the second optical filters 130 and 131 to each pivot between a filtering position and a retreat position. The filtering position is the position at which the first optical filter 130 or the second optical filter 131 is disposed in front of the imaging plane of the image sensor 120 and at which the light before arriving at the imaging plane passes through the first optical filter 130 or the second optical filter 131. The retreat position is the position at which the first optical filter 130 or the second optical filter 131 becomes away from the position in front of the imaging plane.

In this embodiment, the driving mechanism causes the first optical filter 130 to pivot between a first filtering position and a first retreat position, and causes the second optical filter 131 to pivot between a second filtering position and a second retreat position. In the first transmissibility state, the first optical filter 130 is positioned at the first filtering position and the second optical filter 131 is positioned at the second retreat position. In the second transmissibility state, the first optical filter 130 is positioned at the first retreat position and the second optical filter 131 is positioned at the second filtering position.

The detection mechanism 133 detects the first transmissibility state and the second transmissibility state. For example, the detection mechanism 133 detects the first and the second transmissibility states based on the positions of the first and the second optical filters 130 and 131. In the case where the first optical filter 130 is positioned at the first filtering position, the detection mechanism 133 detects the first transmissibility state. In the case where the second optical filter 130 is positioned at the second filtering position, the detection mechanism 133 detects the second transmissibility state.

The flash memory 111 stores therein a first setting range that indicates the aperture value settable in the first transmissibility state and a second setting range that indicates the aperture value settable in the second transmissibility state. The settable aperture value means the aperture value of a diaphragm 230, that is settable by an operation by a user or an automatic program.

The first setting range and the second setting range are set in advance in the manufacture stage of the imaging device 10. For example, the first setting range is set in a range of the aperture value with which any blemish, any hole, or any foreign object of the first optical filter 130 does not appear in any still image or any moving image when the imaging is executed using the first optical filter 130. The second setting range is set in a range of the aperture value with which any blemish, any hole, or any foreign object of the second optical filter 131 does not appear in any still image or any moving image when the imaging is executed using the second optical filter 131.

In this embodiment, the first optical filter 130 is an electronic ND filter and the second optical filter 131 is clear glass, and the transmissibility in the first transmissibility state is therefore smaller than the transmissibility in the second transmissibility state. The first transmissibility state is the state where a blemish, a hole, or a foreign object of the filter tends more to appears in a still image or a moving image than the second transmissibility state. The upper limit value of the first setting range is set to be smaller than the upper limit value of the second setting range.

Many of the blemishes or the holes formed on the optical filters are formed when the filter surfaces are polished, and the size of the blemishes and that of the holes are each substantially equal. The range of the aperture value with which any blemish, any hole or any foreign object does not appear in any still image or any moving image may therefore be determined in advance by evaluating the size of the blemish or the hole of the optical filter.

The camera controller 110 determines whether the first transmissibility state or the second transmissibility state is established, using the detection mechanism 133, and acquires the first setting range or the second setting rage from the flash memory 111 based on the result of the determination. The camera controller 110 limits the aperture value of the diaphragm 230 based on the first setting range or the second setting range.

The interchangeable lens unit 200 includes an optical system OP and a lens controller 210.

The optical system OP is a combination of optical members to form an object image on the imaging plane of the image sensor 120. The optical system OP includes a zoom lens 220, the diaphragm 230, an optical image stabilizer (OIS) lens 240, and a focusing lens 250.

The zoom lens 220 is a lens to vary the magnifying power of the object image formed by the optical system OP. The zoom lens 220 includes one or plural lens(es). The zoom lens 220 is moved forward or backward in an optical axis direction A1 by a zoom lens driving unit 221. The zoom lens driving unit 221 includes a zoom ring and the like that are operable by the user, transfers the operation by the user to the zoom lens 220, and moves forward or backward the zoom lens 220 in the optical axis direction A1.

The diaphragm 230 adjusts the amount of the light entering the imaging plane of the image sensor 120 from the object. The diaphragm 230 adjusts the amount of the light entering the imaging plane by varying the size of a through hole through which the light passes. The diaphragm 230 is driven by a diaphragm driving unit 231.

The IOS lens 240 is a lens to correct a shake of the object image formed by the optical system of the interchangeable lens unit 200. The OIS lens 240 includes one or plural lens(es). The OIS lens 240 reduces the shake of the object image on the image sensor 120 by moving in the direction for the shake of the imaging device 10 to be cancelled out. A function of correcting a camera shake by moving the OIS lens 240 is referred to as "OIS function". The interchangeable lens unit 200 includes a gyro sensor 241, a position sensor 242, an OIS driving unit 243, and an OIS processing unit 244, as a configuration to realize the OIS function.

The gyro sensor 241 is a unit that detects a shake of the interchangeable lens unit 200. The position sensor 242 is a sensor that detects the position of the OIS lens 240 in a plane perpendicular to the optical axis direction A1. The position sensor 242 can be realized by, for example, a magnet and a Hall element. The OIS driving unit 243 moves the OIS lens 240. The OIS driving unit 243 can be realized by, for example, a magnet and a flat plate coil. The OIS processing unit 244 executes a shake correction process of controlling the OIS driving unit 243 based on the results of the detection by the gyro sensor 241 and the position sensor 242 and thereby moving the OIS lens 240 in the plane perpendicular to the optical axis direction A1 such that the shake of the interchangeable lens unit 200 is cancelled out.

The focusing lens 250 is a lens to vary the focus state of the object image formed on the image sensor 120 by the optical system OP. The focusing lens 250 includes one or plural lens(es). The focusing lens 250 is moved in the optical axis direction A1 by a focusing lens driving unit 251. The focusing lens driving unit 251 includes a focus ring and the like that are operable by the user, transfers the operation by the user to the focusing lens 250, and moves forward or backward the focusing lens 250 in the optical axis direction A1.

The zoom lens driving unit 221, the diaphragm driving unit 231, the OIS processing unit 244, and the focusing lens driving unit 251 are each controlled by the lens controller 210.

The lens controller 210 controls the operation of the overall interchangeable lens unit 200 in response to the control from the camera controller 110. The lens controller 210 includes a processor, and the processor executes an instruction to thereby realize a predetermined function. For example, the lens controller 210 may be realized by any of various types of processor such as a CPU, an MPU, a GPU, a DSU, an FPGA, and an ASIC. The processor may include a dedicated electronic circuit designed to realize predetermined functions. The lens controller 210 may include one or plural processor(s).

The lens controller 210 controls the zoom lens driving unit 221, the diaphragm driving unit 231, the OIS processing unit 244, and the focusing lens driving unit 251 based on information stored in a DRAM 211 and a flash memory 212. When the lens controller 210 controls the zoom lens driving unit 221, the diaphragm driving unit 231, the OIS processing unit 244, and the focusing lens driving unit 251, the lens controller 210 uses the DRAM 211 as a work memory.

The flash memory 212 stores therein programs, parameters, lens data, and the like that are used for the control by the lens controller 210. The "lens data" includes the lens name, the lens ID, the serial number, the F-number (the aperture value), the focal length, presence or absence of a motorized zoom function, resolution property information, the characteristic values specific to the interchangeable lens unit 200, and the like. The lens data stored in the flash memory 212 is transmitted to the camera controller 110 by the lens controller 210. The camera controller 110 executes various types of control operation based on the lens data.

(Configuration of Filter Module)

Figure 3:
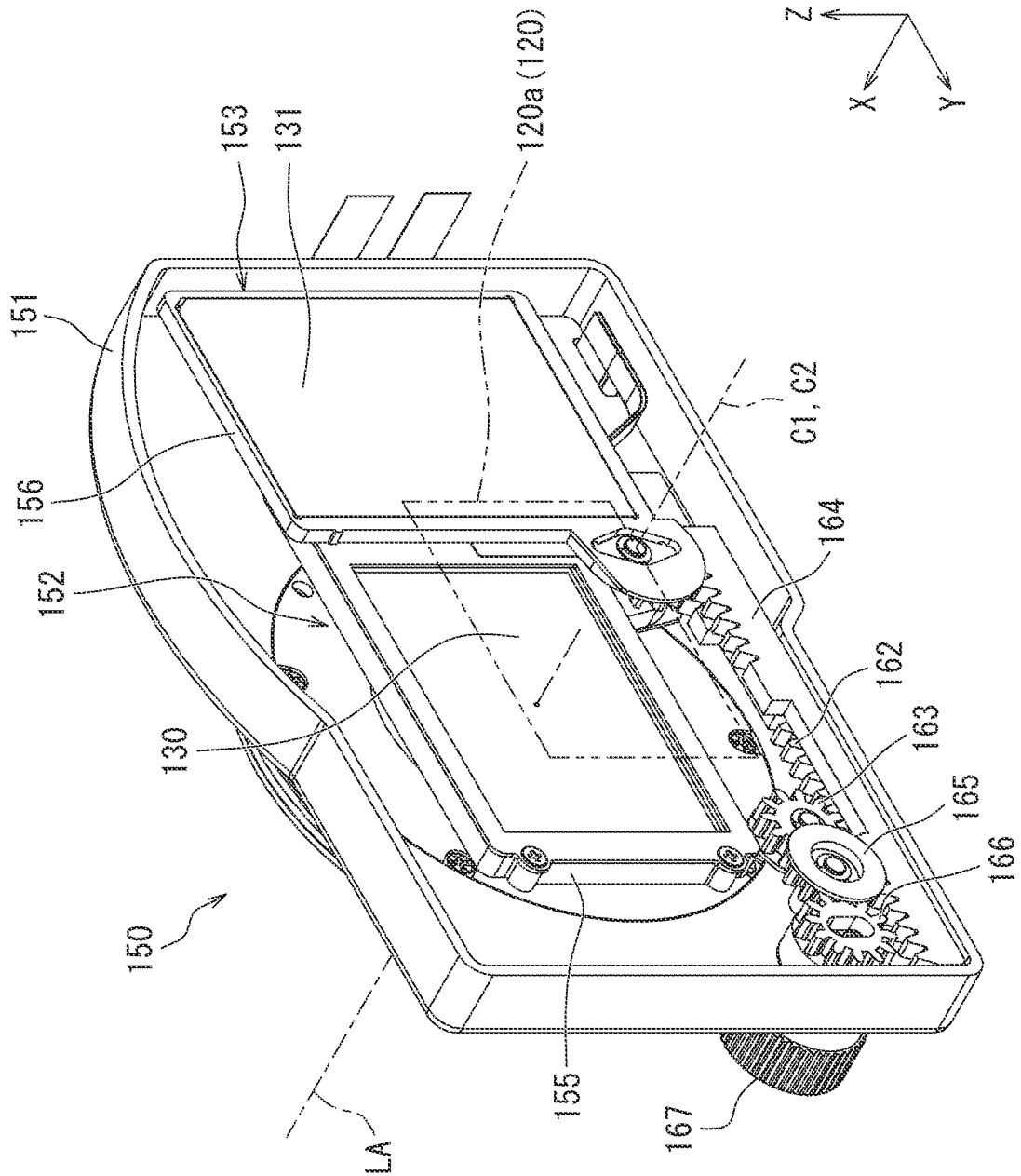
FIG. 3 is a rear perspective diagram of a filter module.
Figure 4:
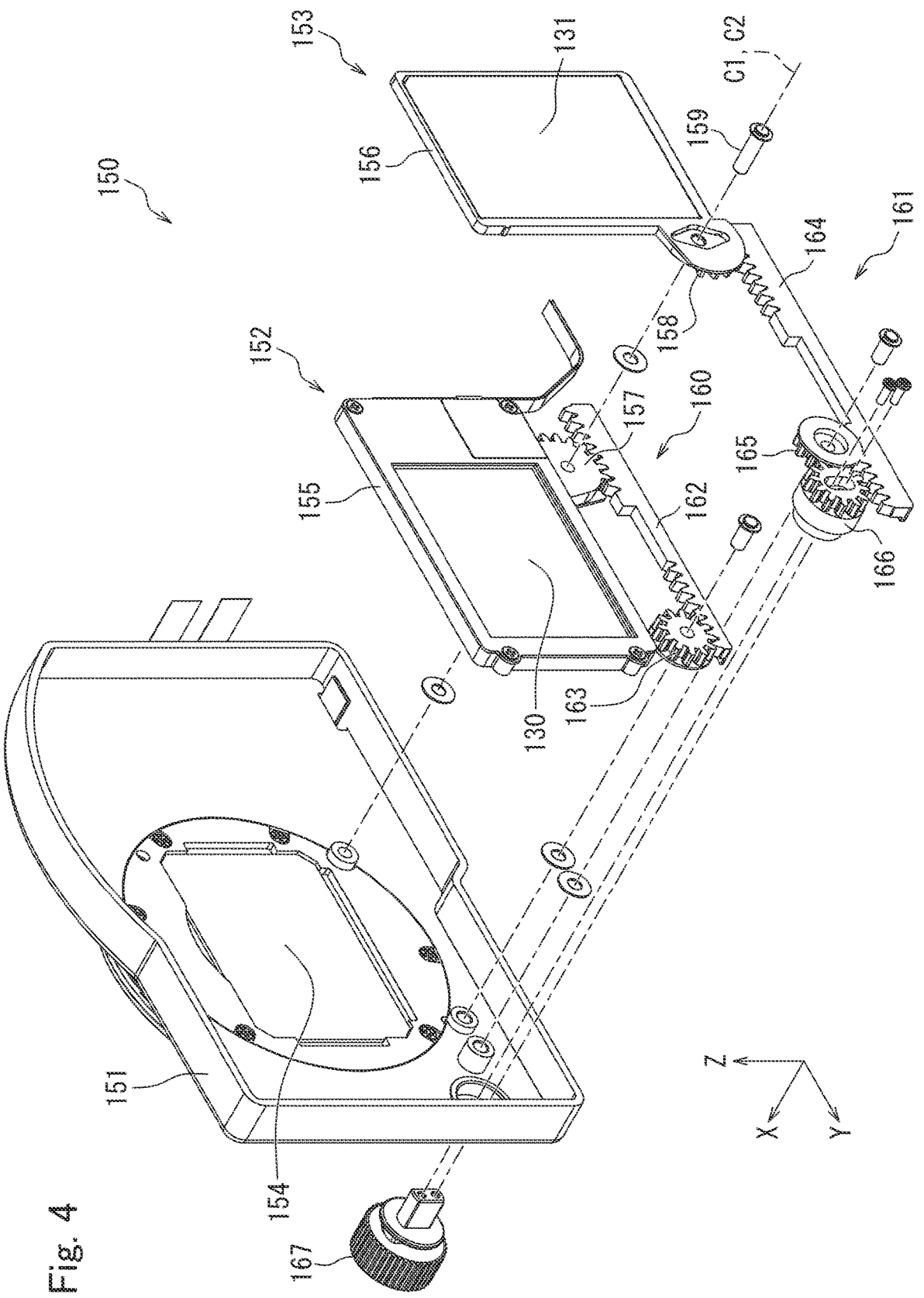
FIG. 4 is an exploded rear perspective diagram of the filter module.

The filter module 150 constituted by the first optical filter 130, the second optical filter 131, the switching mechanism 132, and the detection mechanism 133 will be described with reference to FIGS. 3 and 4. FIG. 3 is a rear perspective diagram of the filter module. FIG. 4 is an exploded rear perspective diagram of the filter module.

As depicted in FIGS. 3 and 4, in this embodiment, the filter module 150 includes a housing 151, a first filter unit 152, and a second filter unit 153.

The housing 151 is made from a metal material such as, for example, aluminum die-cast, and supports the first and the second filter units 152 and 153. In this embodiment, the housing 151 includes a protective glass 154 through which the light from the object is transmitted.

As depicted in FIG. 3, the image sensor 120 faces the protective glass 154 with a distance therebetween in an extension direction of an optical axis LA of the imaging device 10 (that is, the front-back direction of the imaging device 10 (the X-axis direction)), and includes the imaging plane 120a for the light from the object to enter. The optical axis LA intersects with the imaging plane 120a of the image sensor 120 at a right angle and passes through the center of the imaging plane 120a that has a rectangular shape.

In this embodiment, as depicted in FIGS. 3 and 4, the first filter unit 152 includes the first optical filter 130 and a first frame structure 155 that supports the outer circumference of the first optical filter 130. The second filter unit 153 includes the second optical filter 131 and a second frame structure 156 that supports the outer circumference of the second optical filter 131.

In this embodiment, the first and the second optical filters 130 and 131 each have a rectangular shape, similar to the imaging plane 120a of the image sensor 120.

The first filter unit 152, that is, the first frame structure 155 that supports the first optical filter 130 is supported by the housing 151 to be able to pivot centering a first rotation center line C1 that extends in the front-back direction of the imaging device 10 (the X-axis direction). The second filter unit 153, that is, the second frame structure 156 that supports the second optical filter 131 is supported by the housing 151 to be able to pivot centering a second rotation center line C2 that extends in the front-back direction of the imaging device 10.

In this embodiment, as depicted in FIGS. 3 and 4, the first and the second rotation center lines C1 and C2 are positioned on the same straight line. The first filter unit 152 therefore pivots in front of the second filter unit 153. A supporting shaft 159 that supports the first and the second filter units 152 and 153 to each be able to pivot can be commonalized therebetween by the fact that the first and the second rotation center lines C1 and C2 are positioned on the same straight line.

As depicted in FIG. 4, the filter module 150 includes a first driving mechanism 160 that causes the first filter unit 152 to pivot centering the first rotation center line C1, and a second driving mechanism 161 that causes the second filter unit 153 to pivot centering the second rotation center line C2. The first driving mechanism 160 and the second driving mechanism 161 constitute the switching mechanism 132.

In this embodiment, the first and the second driving mechanisms 160 and 161 are each a rack-and-pinion mechanism.

The first driving mechanism 160 includes a first rack 162 that extends in the right-left direction of the imaging device 10 (the Y-axis direction) and that is supported by the housing 151 to be movable in the right-left direction, and a first driving gear 163 that engages with the first rack 162 to move the first rack 162 in the right-left direction. The first rack 162 engages with a pinion 157 that is formed on the first frame structure 155 of the first filter unit 152. The first rack 162 is moved in the right-left direction by the rotation of the first driving gear 163, and the pinion 157 thereby rotates centering the first rotation center line C1. As a result, the first filter unit 152 pivots centering the first rotation center line C1.

The second driving mechanism 161 includes a second rack 164 that extends in the right-left direction of the imaging device 10 (the Y-axis direction) and that is supported by the housing 151 to be movable in the right-left direction, and a second driving gear 165 that engages with the second rack 164 to move the second rack 164 in the right-left direction. The second rack 164 extends in back of and in parallel to the first rack 162. The second rack 164 engages with a pinion 158 that is formed on the second frame structure 156 of the second filter unit 153. The second rack 164 is moved in the right-left direction by the rotation of the second driving gear 165, and the pinion 157 thereby rotates centering the second rotation center line C2. As a result, the second filter unit 153 pivots centering the second rotation center line C2.

In this manner, the first filter unit 152 is caused to pivot by the first driving mechanism 160, centering the first rotation center line C1 between the first filtering position and the first retreat position. The second filter unit 153 is caused to pivot by the second driving mechanism 161, centering the second rotation center line C2 between the second filtering position and the second retreat position.

Figure 5A:
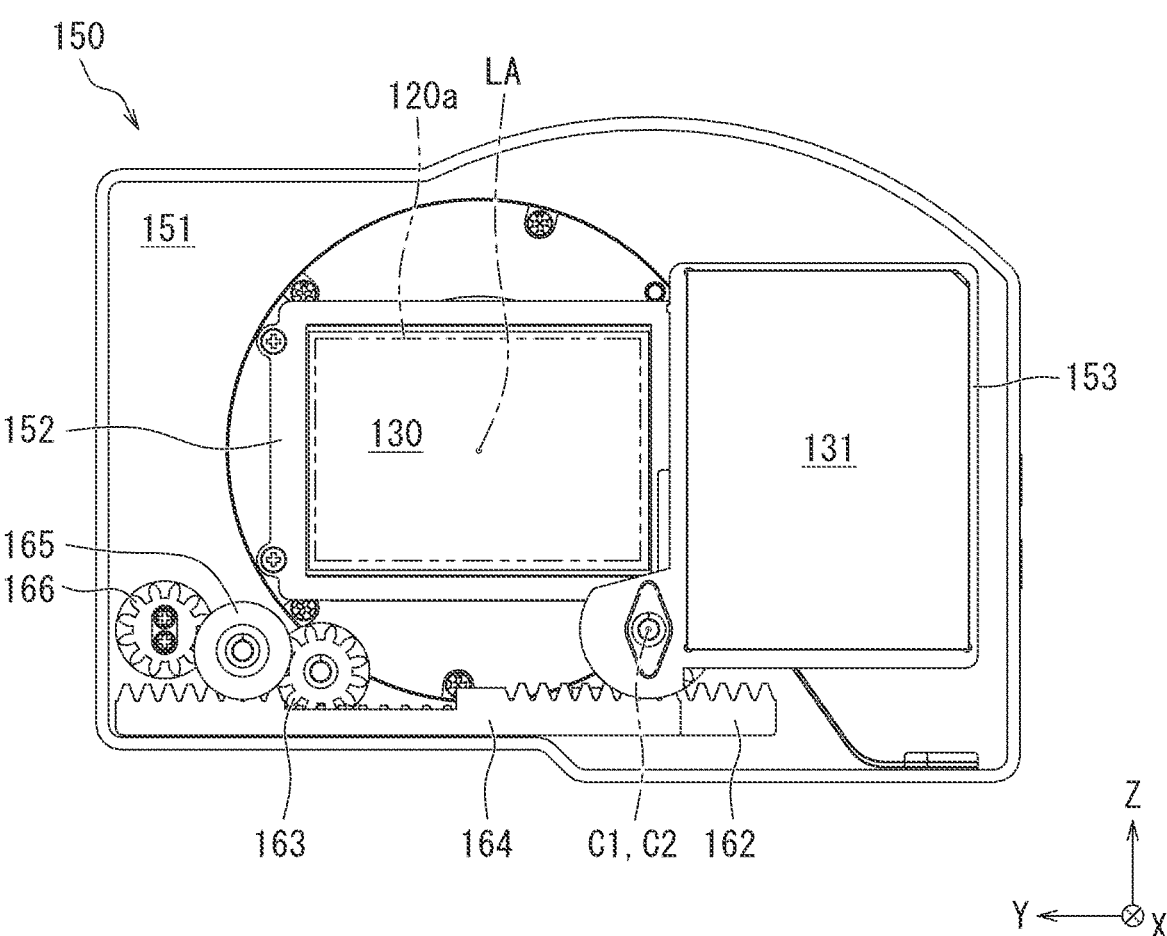
FIG. 5A is a rear diagram of the filter module in the state where a first filter unit is positioned at a first filtering position and a second filter unit is positioned at a second retreat position.
Figure 5B:
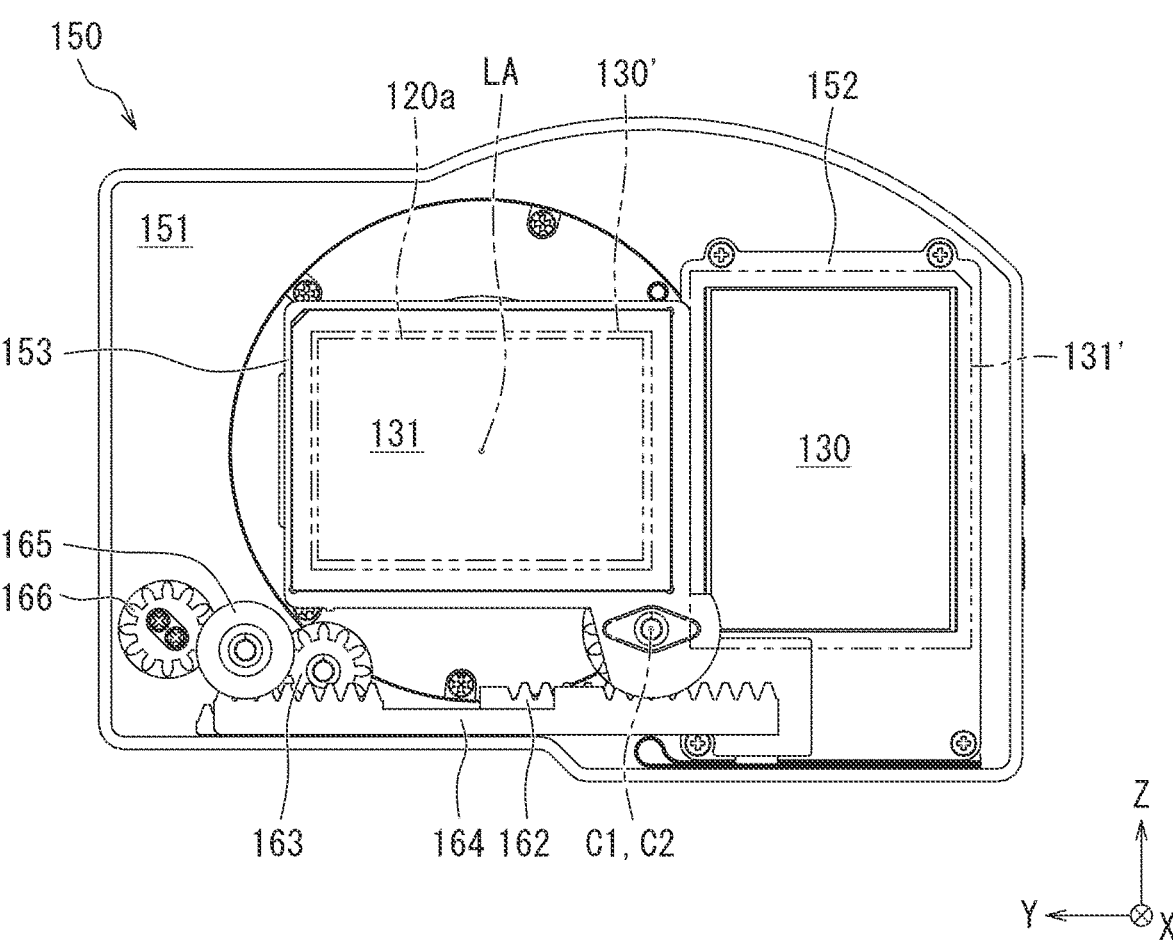
FIG. 5B is a rear diagram of the filter module in the state where the first filter unit is positioned at a first retreat position and the second filter unit is positioned at a second filtering position.
Figure 6A:
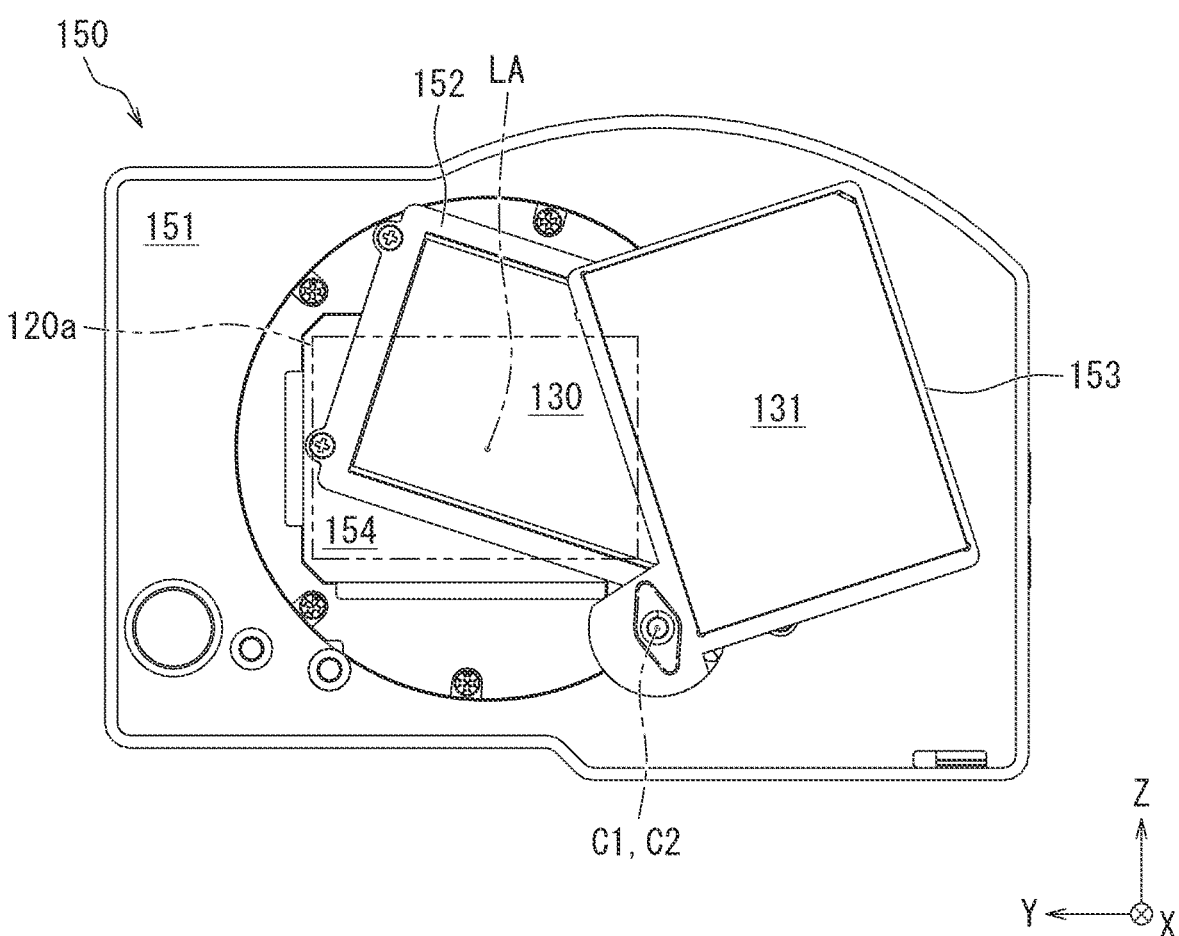
FIG. 6A is a rear diagram of the filter module in the state where the first filter unit pivots toward the first retreat position and the second filter unit pivots toward the second filtering position.
Figure 6B:
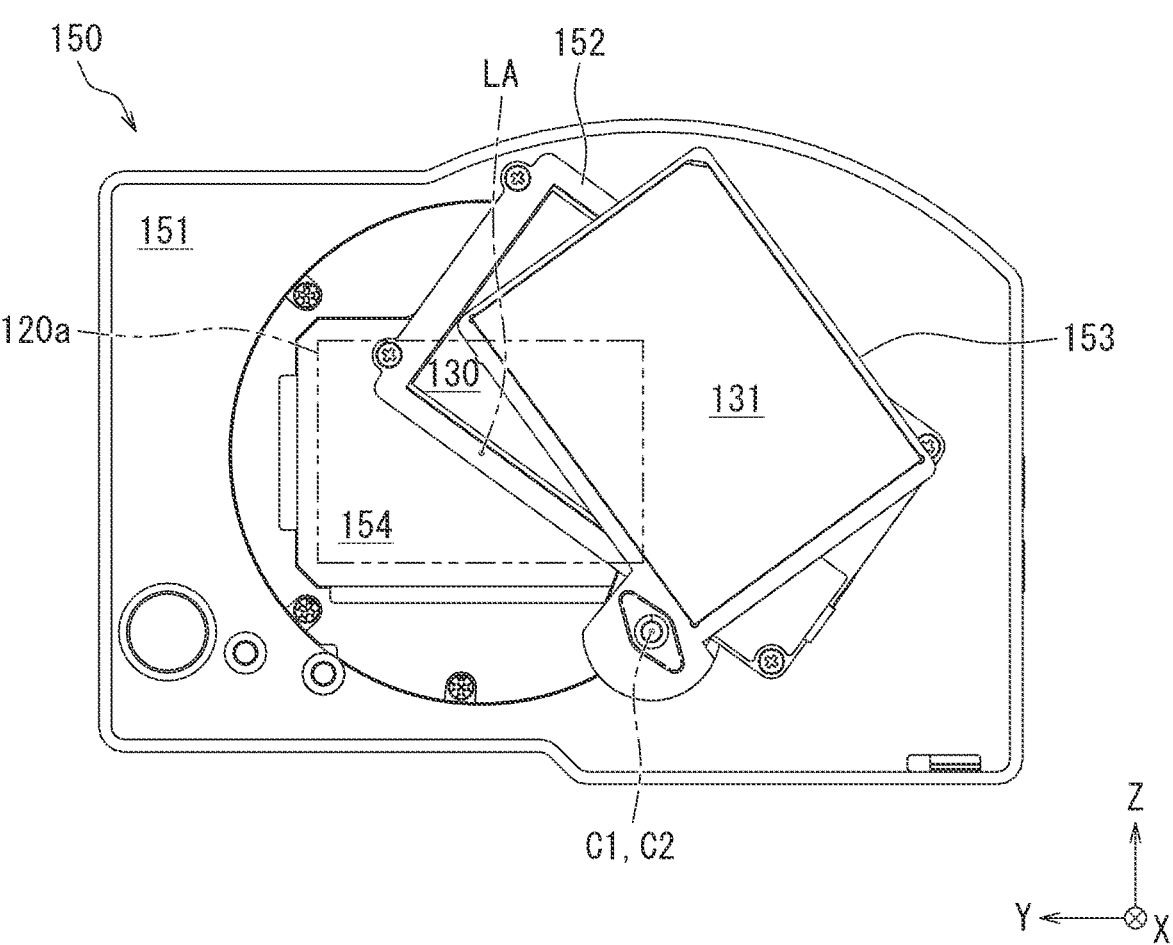
FIG. 6B is a rear diagram of the filter module depicting the state of the pivoting of each of the first and the second filter units, continued from FIG. 6A.
Figure 6C:
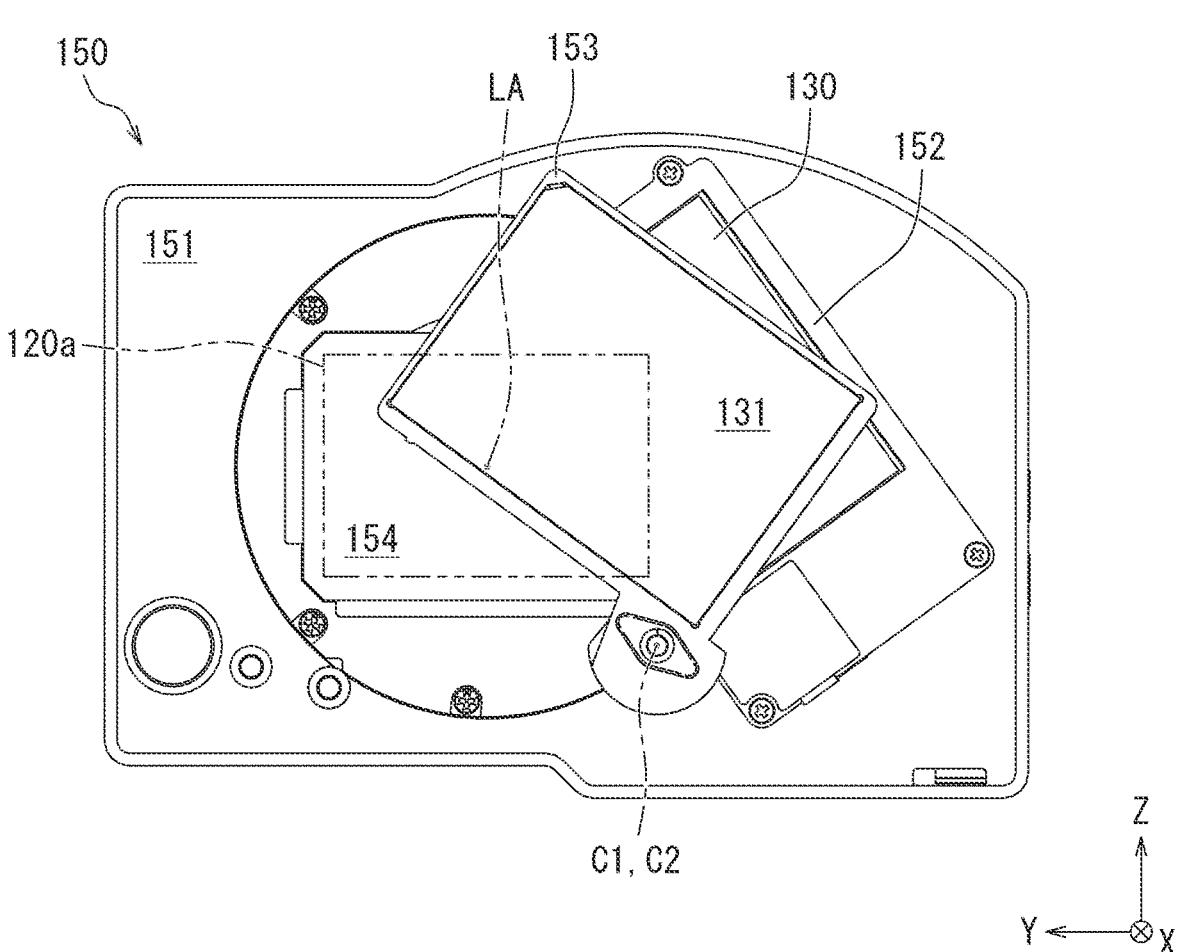
FIG. 6C is a rear diagram of the filter module depicting the state of the pivoting of each of the first and the second filter units, continued from FIG. 6B.
Figure 6D:
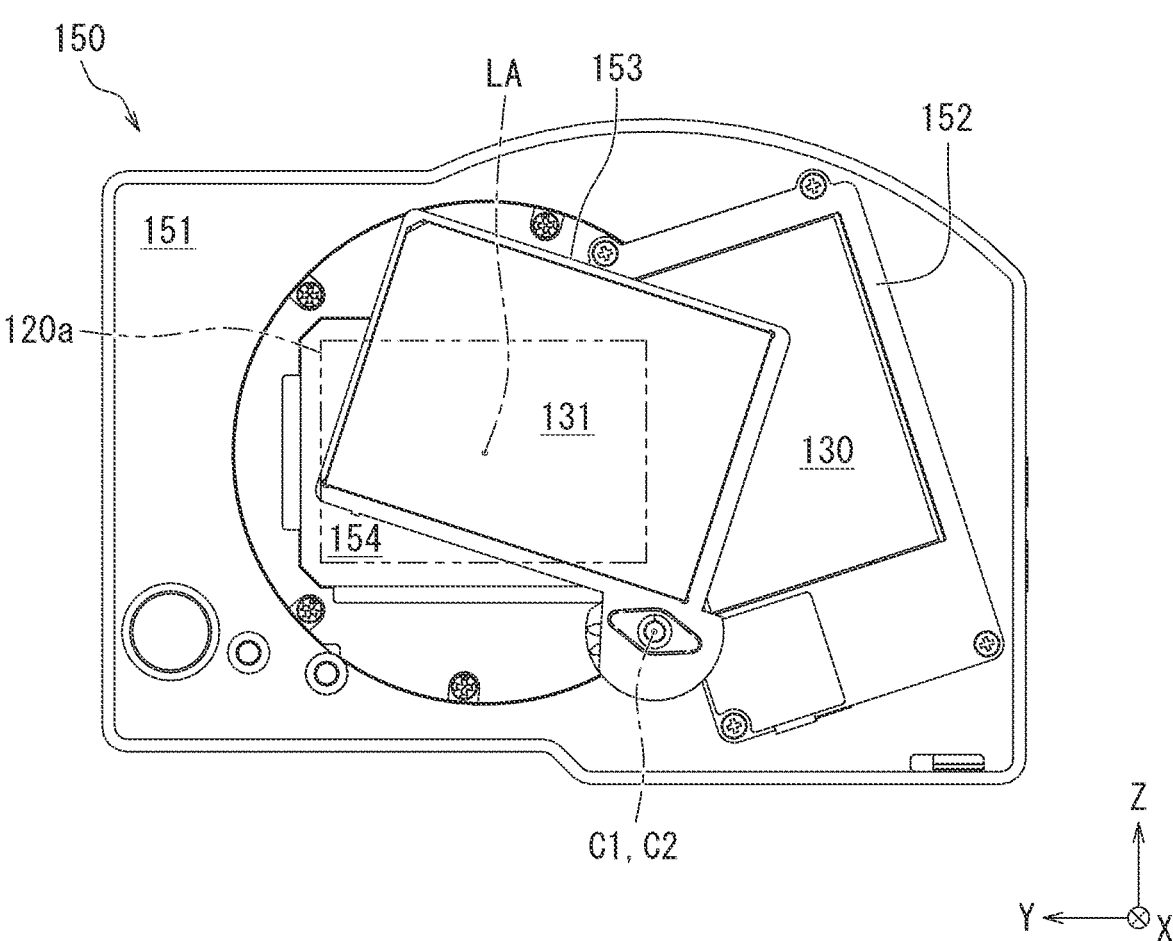
FIG. 6D is a rear diagram of the filter module depicting the state of the pivoting of each of the first and the second filter units, continued from FIG. 6C.

FIG. 5A is a rear diagram of the filter module in the state where the first filter unit is positioned at the first filtering position and the second filter unit is positioned at the second retreat position. FIG. 5B is a rear diagram of the filter module in the state where the first filter unit is positioned at the first retreat position and the second filter unit is positioned at the second filtering position.

As depicted in FIG. 5A, the first filter unit 152 is caused to pivot by the first driving mechanism 160 to be placed at the first filtering position. For example, when the first filter unit 152 is positioned at the first filtering position, the first optical filter 130 is placed in front of the imaging plane 120a of the image sensor 120. The light from the object after being transmitted through the protective glass 154 and before arriving at the imaging plane 120a is transmitted through the first optical filter 130. As a result, the light from the object, that is filter-processed by the first optical filter 130 enters the imaging plane 120a.

As depicted in FIG. 5B, the first filter unit 152 is caused to pivot by the first driving mechanism 160 to be placed at the first retreat position. For example, the first filter unit 152 retreats to a position that is away from the position in front of the imaging plane 120a of the image sensor 120 as the first retreat position. In this embodiment, the first filter unit 152 retreats to the left from the position in front of the imaging plane 120a (in the case where the first filter unit 152 is seen from the front side of the imaging device 10). The light from the object thereby enters the imaging plane 120a without being obstructed by the first filter unit 152, that is, without being transmitted through the first optical filter 130.

As depicted in FIG. 5B, the second filter unit 153 is caused to pivot by the second driving mechanism 161 to be placed at the second filtering position. For example, when the second filter unit 153 is positioned at the second filtering position, the second optical filter 131 is present in front of the imaging plane 120a of the image sensor 120. The light from the object after being transmitted through the protective glass 154 and before arriving at the imaging plane 120a is transmitted through the second optical filter 131. As a result, the light from the object, that is filter-processed by the second optical filter 131 enters the imaging plane 120a. The second filtering position is positioned in back of the first filtering position.

As depicted in FIG. 5A, the second filter unit 153 is caused to pivot by the second driving mechanism 161 to be placed at the second retreat position. For example, the second filter unit 153 retreats to a position that is away from the position in front of the imaging plane 120a of the image sensor 120 as the second retreat position. In the case of this embodiment, the second filter unit 153 retreats to the left from the position in front of the imaging plane 120a (in the case where the second filter unit 153 is seen from the front side of the imaging device 10). The light from the object thereby enters the imaging plane 120a without being obstructed by the second filter unit 153, that is, without being transmitted through the second optical filter 131. The second retreat position is positioned in back of the first retreat position.

In this embodiment, as depicted in FIG. 5B, the first filter unit 152 is caused to pivot by the first driving mechanism 160 by substantially 90 degrees centering the first rotation center line C1. The positional relation between the first filtering position and the first retreat position is therefore a positional relation in which, when the first filter unit 152 positioned at one of the first filtering position and the first retreat position pivots by 90 degrees, the first filter unit 152 is placed at the other position. The attitude of the first optical filter 130 (130') of the first filter unit 152 positioned at the first filtering position (a dashed double-dotted line) and the attitude of the first optical filter 130 taken when the first optical filter 130 is positioned at the first retreat position (a solid line) are thereby different from each other by 90 degrees. The longitudinal direction of the first optical filter 130 is varied from the right-left direction of the imaging device 10 (the Y-axis direction) to the height direction thereof (the Z-axis direction).

The position of the first rotation center line C1 of the first filter unit 152 is determined such that the first optical filter 130 (130') positioned at the first filtering position and the first optical filter 130 positioned at the first retreat position are adjacent to each other as closely as possible without overlapping on each other. For example, in this embodiment, the position of the first rotation center line C1 is determined not to pass through the first optical filter 130 and to be close to a lower left corner portion of the first optical filter 130 (130') when the first optical filter 130 is positioned at the first filtering position (in the case where the first rotation center line C1 is seen from the front side of the imaging device 10).

Due to the first rotation center line C1, the move range of the first optical filter 130, that is, the first filter unit 152 can be reduced compared to that of the case where the first optical filter 130 is translated in the right-left direction of the imaging device 10 (the Y-axis direction). As a result, any increase of the size of the imaging device 10 especially in the right-left direction can be suppressed. Any degradation of the design of the imaging device 10 due to an increase of the size in the right-left direction can be suppressed.

In this embodiment, as depicted in FIG. 5B, the second filter unit 153 is caused to pivot by the second driving mechanism 161 by substantially 90 degrees centering the second rotation center line C2. The positional relation between the second filtering position and the second retreat position is therefore a positional relation in which, when the second filter unit 153 positioned at one of the second filtering position and the second retreat position pivots by 90 degrees, the second filter unit 153 is placed at the other thereof. The attitude of the second optical filter 131 of the second filter unit 153 positioned at the second filtering position (a solid line) and the attitude of the second optical filter 131 (131') taken when the second optical filter 131 is positioned at the second retreat position (a dashed double-dotted line) are thereby different from each other by 90 degrees. The longitudinal direction of the second optical filter 131 is therefore varied from the right-left direction of the imaging device 10 (the Y-axis direction) to the height direction thereof (the Z-axis direction).

The position of the second rotation center line C2 of the second filter unit 153 is determined such that the second optical filter 131 positioned at the second filtering position and the second optical filter 131 (131') positioned at the second retreat position are adjacent to each other as closely as possible without overlapping on each other. For example, in this embodiment, the position of the second rotation center line C2 is determined not to pass through the second optical filter 131 and to be close to a lower left corner portion of the second optical filter 131 when the second optical filter 131 is positioned at the second filtering position (in the case where the second rotation center line C2 is seen from the front side of the imaging device 10).

Due to the second rotation center line C2, the move range of the second optical filter 131, that is, the second filter unit 153 can be reduced compared to that of the case where the second optical filter 131 is translated in the right-left direction of the imaging device 10 (the Y-axis direction). As a result, any increase of the size of the imaging device 10 especially in the right-left direction can be suppressed. Any degradation of the design of the imaging device 10 due to the increase of the size in the right-left direction can be suppressed.

Similar to the first filter unit 152, the second filter unit 153 also pivots by substantially 90 degrees, and the design of the imaging device 10 is therefore not significantly influenced compared to that of the case where the second filter unit 153 is translated in the right-left direction of the imaging device 10 (the Y-axis direction) or the height direction thereof (the Z-axis direction).

In this embodiment, the pivoting operation of the first filter unit 152 by the first driving mechanism 160 and the pivoting operation of the second filter unit 153 by the second driving mechanism 161 synchronize with each other.

For example, as depicted in FIG. 5A, the pivoting operations of the first and the second filter units 152 and 153 synchronize with each other such that, when the first filter unit 152 is positioned at the first filtering position (that is, the position in front of the imaging plane 120a of the image sensor 120), the second filter unit 153 is positioned at the second retreat position (that is, the position away from the position in front of the imaging plane 120a). As depicted in FIG. 5B, the pivoting operations of the first and the second filter units 152 and 153 synchronize with each other such that, when the first filter unit 152 is positioned at the first retreat position, the second filter unit 153 is positioned at the second filtering position. The first driving mechanism 160 and the second driving mechanism 161 therefore synchronize with each other.

In this embodiment, as depicted in FIGS. 3 and 4, the first driving gear 163 of the first driving mechanism 160 and the second driving gear 165 of the second driving mechanism 161 engage with each other. The second driving gear 165 engages with a motivity transmission gear 166 to be a motivity source that supplies the motivity to the first driving mechanism 160 and the second driving mechanism 161. The motivity transmission gear 166 is disposed on the front face of the imaging device 10 and is coupled with a rotary nob 167 to be operated by being rotated by the user.

When the user rotates the rotary nob 167 from the state depicted in FIG. 5A, the motivity transmission gear 166 is rotated and the first driving gear 163 and the second driving gear 165 are thereby synchronously rotated. As a result, the first rack 162 engaging with the first driving gear 163 is moved rightward (in the case where the first rack 162 is seen from the front side of the imaging device 10) and the second rack 164 engaging with the second driving gear 165 is moved in the opposite direction, that is, leftward. The first filter unit 152 and the second filter unit 153 pivot each in the direction opposite to that of each other by the fact that the first rack 162 and the second rack 164 are each moved in the direction opposite to that of each other.

FIGS. 6A to 6D are rear diagrams of the filter module in the state where the first filter unit pivots toward the first retreat position and the second filter unit pivots toward the second filtering position.

As depicted in FIGS. 6A to 6D, when the user rotates forward the rotary nob 167 from the state depicted in FIG. 5A, the first filter unit 152 pivots from the first filtering position toward the first retreat position and the second filter unit 153 pivots from the second retreat position toward the second filtering position. On the way of the pivoting, the first filter unit 152 and the second filter unit 153 overlap on each other in the front-back direction of the imaging device 10 (the X-axis direction). In this embodiment, the second filter unit 153 passes by behind the first filter unit 152.

When the user rotates the rotary nob 167 in the reverse direction from the state depicted in FIG. 5B, the first filter unit 152 pivots from the first retreat position toward the first filtering position and the second filter unit 153 pivots from the second filtering position toward the second retreat position.

Due to the above synchronous operations of the first driving mechanism 160 and the second driving mechanism 161, the first filter unit 152 and the second filter unit 153 can be caused to simultaneously pivot by rotating the one rotary nob 167. The user can place the first optical filter 130 or the second optical filter 131 in front of the imaging plane 120a of the image sensor 120 by rotating the rotary nob 167 in the forward direction or the reverse direction. As a result, the user can easily change the optical filter to be used from the first optical filter 130 to the second optical filter 131 and vice versa.

In this embodiment, the first optical filter 130 is an electronic ND filter whose light transmissibility is variable and the second optical filter 131 is a filter whose light transmissibility is fixed such as, for example, clear glass. The second optical filter 131 has a light path length that is substantially equal to the light path length of the first optical filter 130 such that the focus does not vary when the first optical filter 130 is changed to the second optical filter 131.

Figure 7:
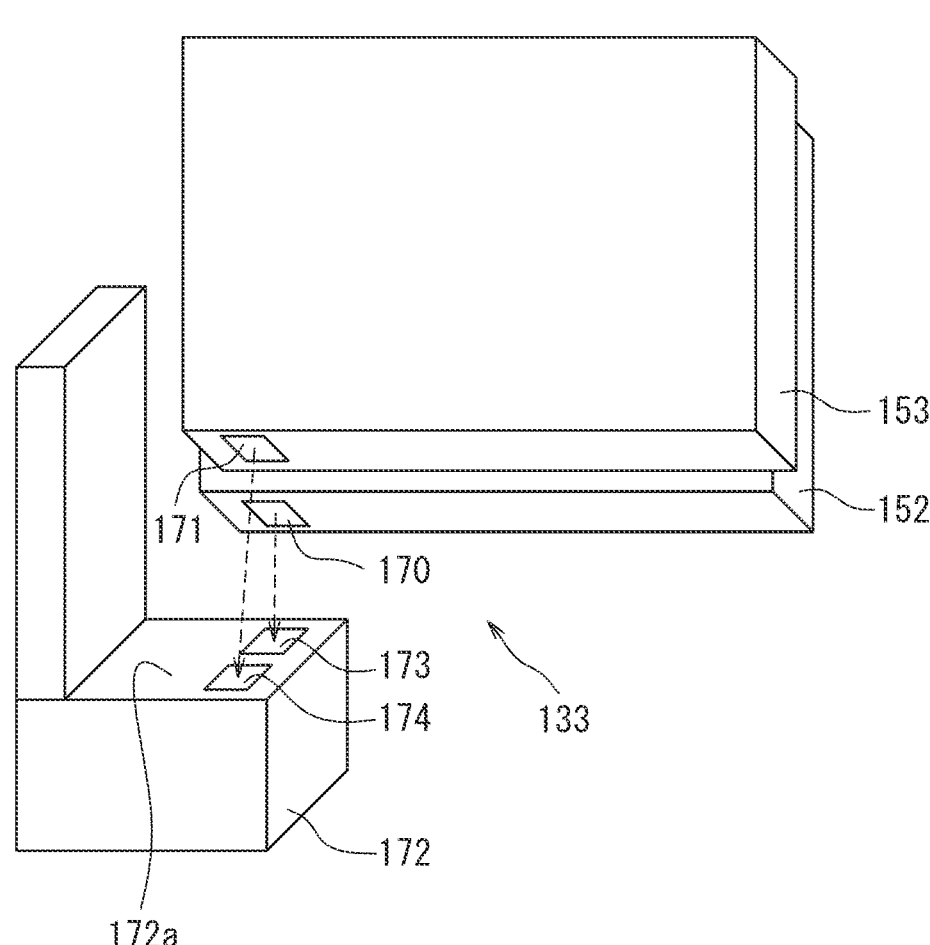
FIG. 7 is a schematic diagram of a detection mechanism.

FIG. 7 is a schematic diagram of the detection mechanism.

As depicted in FIG. 7, the first filter unit 152 and the second filter unit 153 respectively have a first electric contact 170 and a second electric contact 171 disposed thereon. For example, the first electric contact 170 is disposed on the first frame structure 155. When the first filter unit 152 is positioned at the first filtering position, the first electric contact 170 is position on a bottom face of the of the first frame structure 155. The second electric contact 171 is disposed on the second frame structure 156. When the second filter unit 153 is positioned at the second filtering position, the second electric contact 171 is positioned on a bottom face of the second frame structure 156.

The filter module 150 includes a contact base 172 that includes a contact face 172a to contact with the first and the second filter units 152 and 153. The contact face 172a of the contact base 172 has a third electric contact 173 and a fourth electric contact 174 disposed thereon. The third electric contact 173 contacts with the first electric contact 170 and is electrically connected thereto when the first filter unit 152 is positioned at the first filtering position. The third electric contact 173 does not contact with the first electric contact 170 and is not electrically connected thereto when the first filter unit 152 is positioned at the first retreat position. The fourth electric contact 174 contacts with the second electric contact 171 and is electrically connected thereto when the second filter unit 153 is positioned at the second filtering position. The fourth electric contact 174 does not contact with the second electric contact 171 and is not electrically connected thereto when the second filter unit 153 is positioned at the second retreat position.

The first to the fourth electric contacts 170, 171, 173, and 174 are each formed by an electrically conductive member such as, for example, copper. The first to the fourth electric contacts 170, 171, 173, and 174 are each, for example, an electrode.

The detection mechanism 133 detects presence or absence of electric connection between the first electric contact 170 and the third electric contact 173, and presence or absence of electric connection between the second electric contact 171 and the fourth electric contact 174. The camera controller 110 determines whether the first transmissibility state or the second transmissibility state is established, based on the presence or the absence of the electric connection of the first to the fourth electric contacts 170, 171, 173, and 174 detected by the detection mechanism 133. For example, in the case where the first electric contact 170 and the third electric contact 173 are electrically connected to each other, the camera controller 110 determines that the first transmissibility state is established where the first optical filter 130 is positioned at the first filtering position. In the case where the second electric contact 171 and the fourth electric contact 174 are electrically connected to each other, the camera controller 110 determines that the second transmissibility state is established where the second optical filter 131 is positioned at the second filtering position.

(Communication Between Camera Body and Interchangeable Lens Unit)

Figure 8:
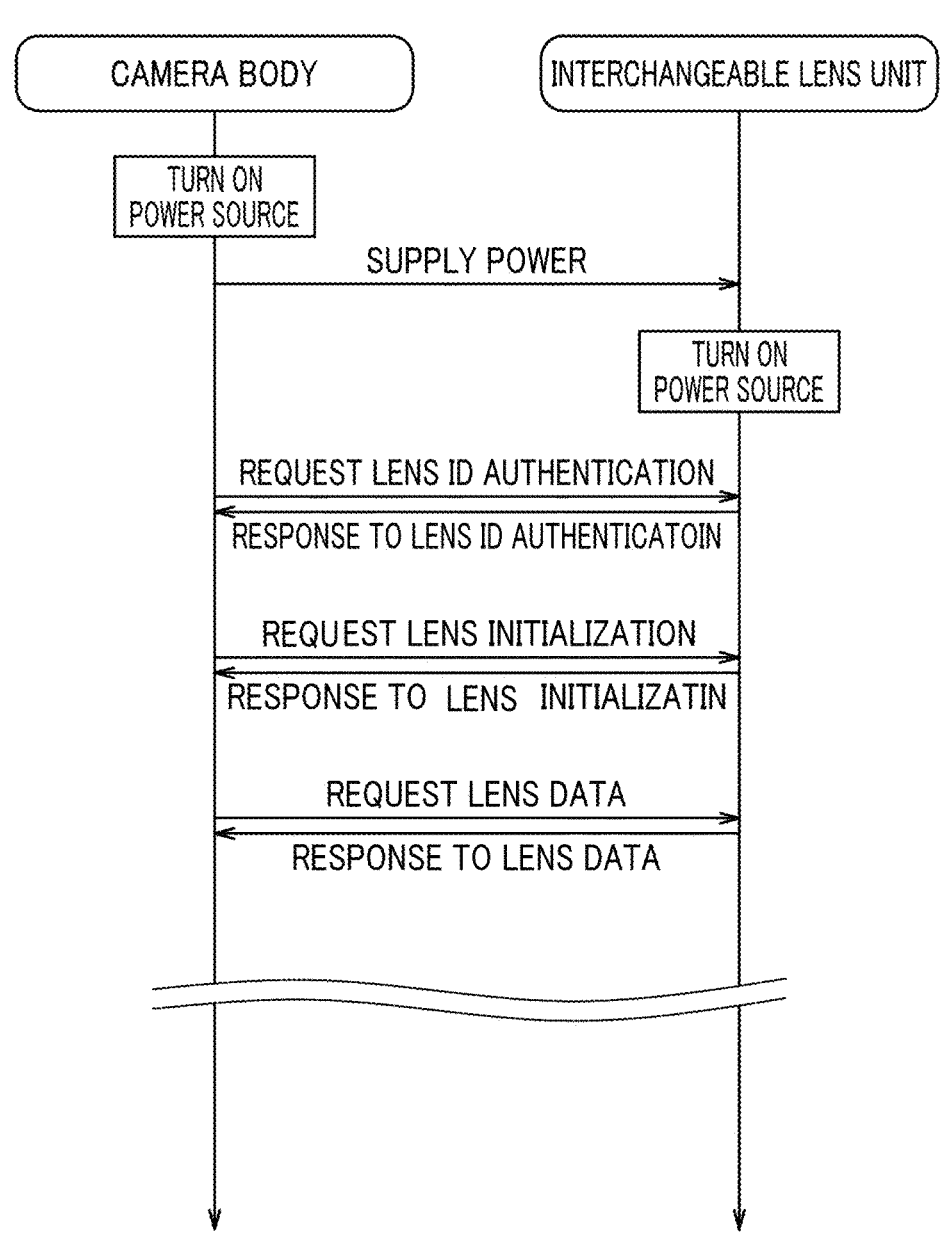
FIG. 8 is a schematic diagram for explaining initial communication between a camera body and an interchangeable lens unit.

Initial communication between the camera body 100 and the interchangeable lens unit 200 will be described with reference to FIG. 8. FIG. 8 is a schematic diagram for explaining the initial communication between the camera body and the interchangeable lens unit.

As depicted in FIG. 8, when the power source of the camera body 100 is turned on, a power source is supplied from the camera body 100 to the interchangeable lens unit 200. The power source of the interchangeable lens unit 200 is thereby turned on. For example, the camera body 100 and the interchangeable lens unit 200 are connected to each other by the body mount 101 and the lens mount 201. The electric power from the camera body 100 is supplied to the interchangeable lens unit 200 through the body mount 101 and the lens mount 201.

When the power sources of the camera body 100 and the interchangeable lens unit 200 are turned on, the initial communication is executed between the camera body 100 and the interchangeable lens unit 200. For example, the camera controller 110 of the camera body 100 transmits a lens ID authentication request to the interchangeable lens unit 200. When the lens controller 210 of the interchangeable lens unit 200 receives the lens ID authentication request from the camera body 100, the lens controller 210 transmits a lens ID authentication response to authenticate the lens ID, to the camera body 100.

The camera controller 110 of the camera body 100 transmits a lens initialization request to the interchangeable lens unit 200. The lens controller 210 of the interchangeable lens unit 200 executes initialization of the interchangeable lens unit 200 in accordance with the lens initialization request from the camera body 100. When the initialization is completed, the lens controller 210 transmits a lens initialization completion response indicating that the initialization of the lens is completed, to the camera body 100.

The camera controller 110 of the camera body 100 transmits a lens data request to the interchangeable lens unit 200. When the lens controller 210 of the interchangeable lens unit 200 receives the lens data request from the camera body 100, the lens controller 210 transmits the lens data to the camera body 100.

Figure 9:
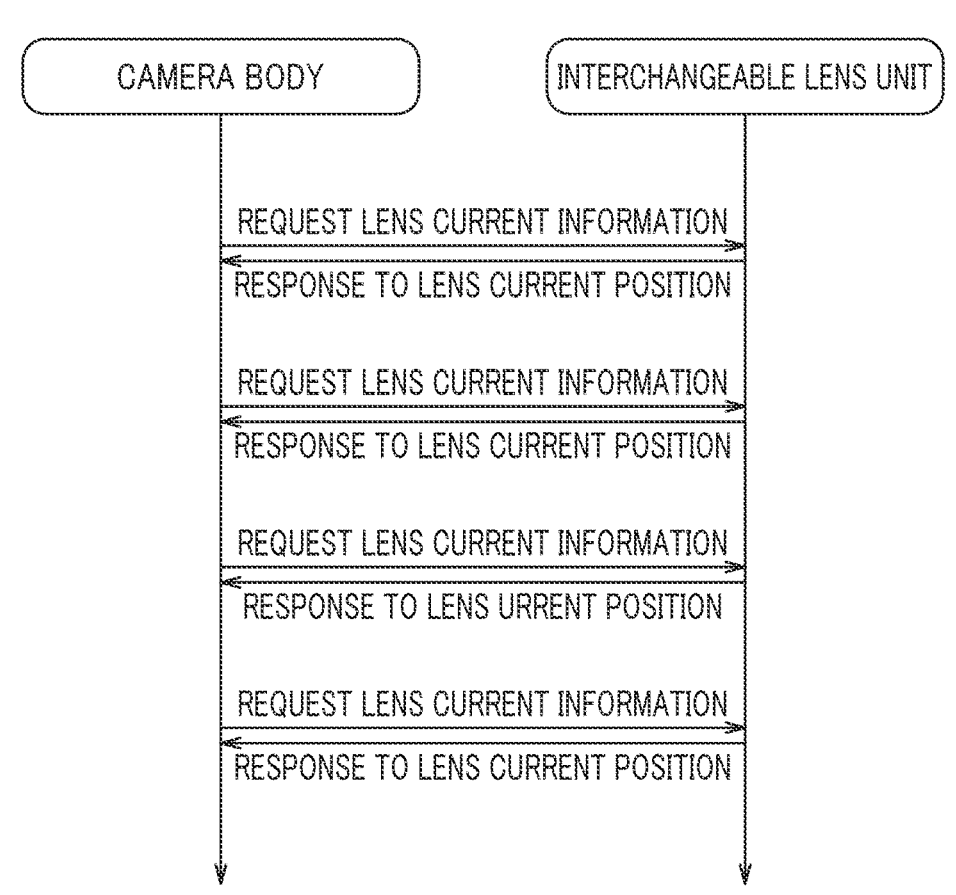
FIG. 9 is a schematic diagram for explaining constant communication between the camera body and the interchangeable lens unit.

Constant communication between the camera body 100 and the interchangeable lens unit 200 will next be described with reference to FIG. 9. FIG. 9 is a schematic diagram for explaining the constant communication between the camera body and the interchangeable lens unit.

As depicted in FIG. 9, the camera controller 110 of the camera body 100 transmits a lens current information request to the interchangeable lens unit 200. The lens current information request is current information on the interchangeable lens unit 200 and includes information on, for example, the current aperture value or the current focus. When the lens controller 210 of the interchangeable lens unit 200 receives the lens current information request from the camera body 100, the lens controller 210 transmits a lens current information response to the camera body 100. The transmission and the reception of the request and the response for the lens current information between the camera body 100 and the interchangeable lens unit 200 are repeatedly executed regularly.

(Operation)

Figure 10:
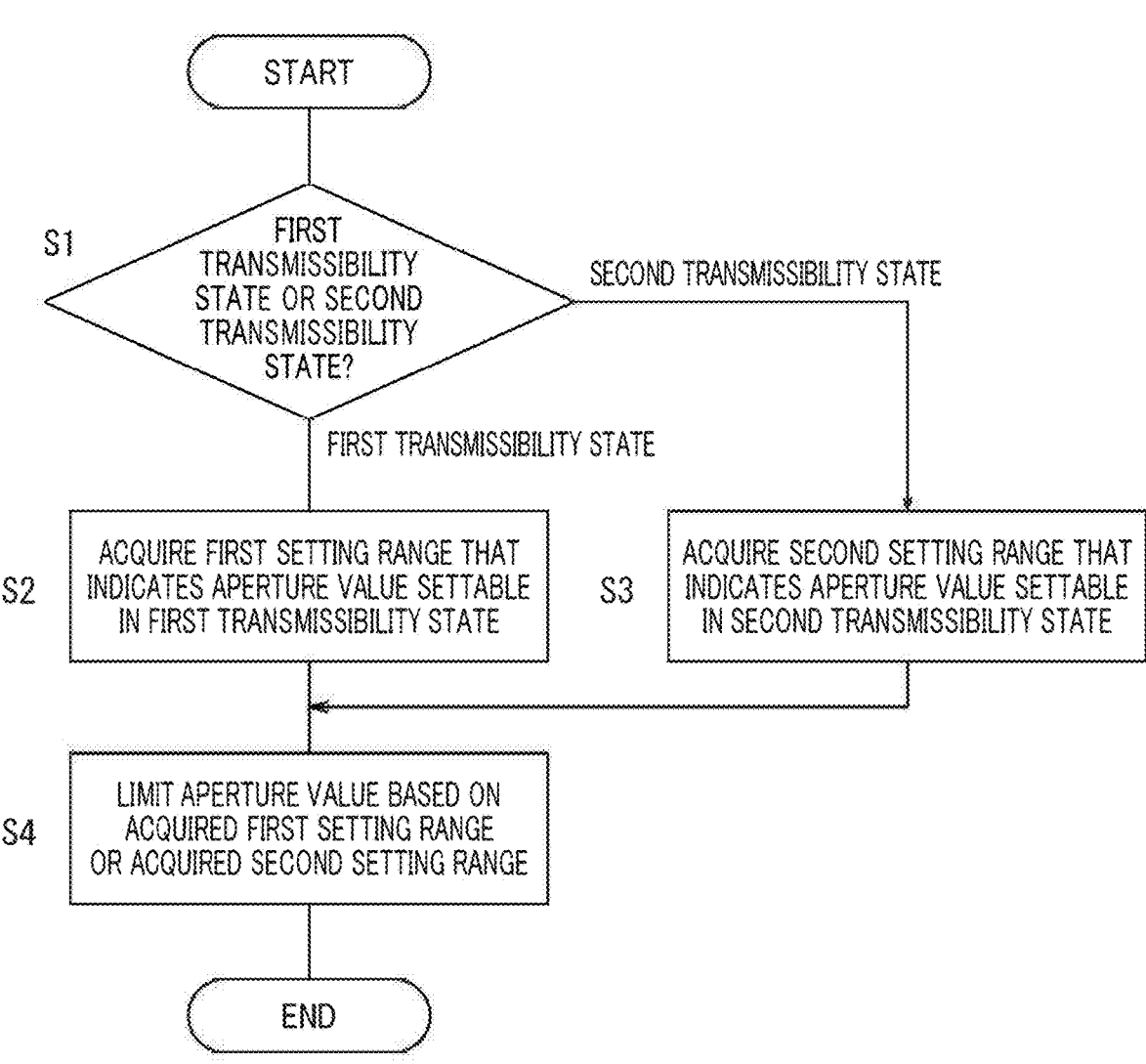
FIG. 10 is a schematic flowchart of a control method of the imaging device according to the first embodiment of the present disclosure.

An operation, that is, a control method of the imaging device according to the first embodiment of the present disclosure will be described with reference to FIG. 10. FIG. 10 is a schematic flowchart of the control method of the imaging device according to the first embodiment of the present disclosure;

A process depicted in FIG. 10 is started, for example, when the switching of the first optical filter 130 or the second optical filter 131 is executed.

As depicted in FIG. 10, at step S1, the camera controller 110 determines whether the first transmissibility state or the second transmissibility state is established. For example, the detection mechanism 133 detects whether the first optical filter 130 is positioned at the first filtering position or the second optical filter 131 is positioned at the second filtering position. The camera controller 110 determines whether the first transmissibility state or the second transmissibility state is established, based on the result of the detection by the detection mechanism 133.

In the case where the camera controller 110 determines that the first transmissibility state is established, the process advances to step S2. In the case where the camera controller 110 determines that the second transmissibility state is established, the process advances to step S3.

At step S2, the camera controller 110 acquires the first setting range that indicates the aperture value settable in the first transmissibility state. The first setting range is stored in the flash memory 111. The camera controller 110 acquires the first setting range from the flash memory 111.

The first setting range is a range of the aperture value with which any blemish, any hole, or any foreign object on the filter surface of the first optical filter 130 does not appear in the image when the imaging is executed using the first optical filter 130. In this embodiment, the first optical filter 130 is an electronic ND filter and, for example, the first setting rage is therefore set to be a range from F-open to F8 as the F-number that is the aperture value.

At step S3, the camera controller 110 acquires the second setting range that indicates the aperture value settable in the second transmissibility state. The second setting range is stored in the flash memory 111. The camera controller 110 acquires the second setting range from the flash memory 111.

The second setting range is a range of the aperture value with which any blemish, any hole, or any foreign object on the filter surface of the second optical filter 131 does not appear in the image when the imaging is executed using the second optical filter 131. In this embodiment, the second optical filter 131 is clear glass whose transmissibility is substantially 100% and, for example, the second setting rage is therefore set to be a range from F-open to F22 as the F-number that is the aperture value.

At step S4, the camera controller 110 limits the aperture value based on the first setting range or the second setting range, that is acquired. For example, the camera controller 110 limits the aperture value not to exceed the first setting range or the second setting range, that is acquired.

For example, in the case where the first setting range is set to be from F-open to F8 at step S2, the camera controller 110 limits the aperture value such that any aperture value exceeding F8 cannot be set.

In the case of this embodiment, a warning message is displayed on the liquid crystal monitor 103 when the aperture value is varied to exceed the first setting range or the second setting range.

Figure 11:
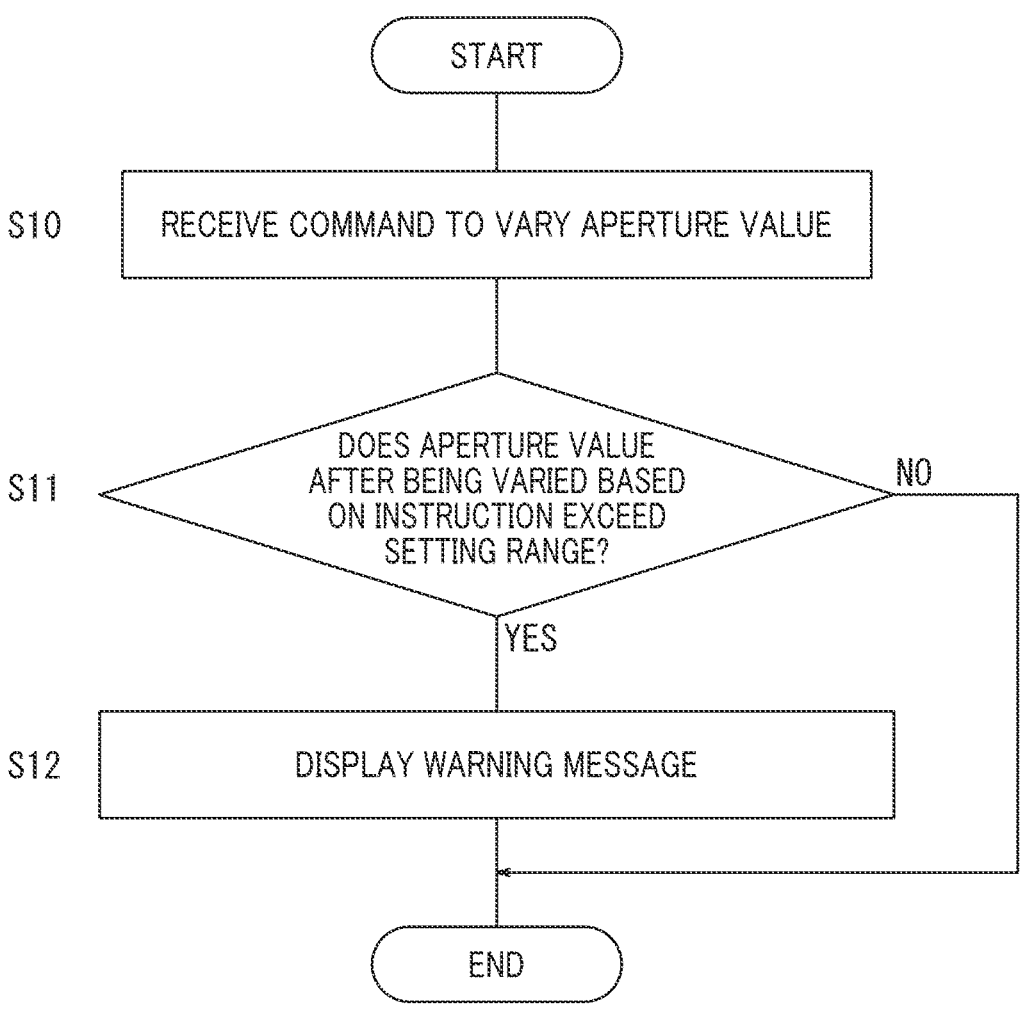
FIG. 11 is a schematic flowchart for displaying a waning message.
Figure 12A:
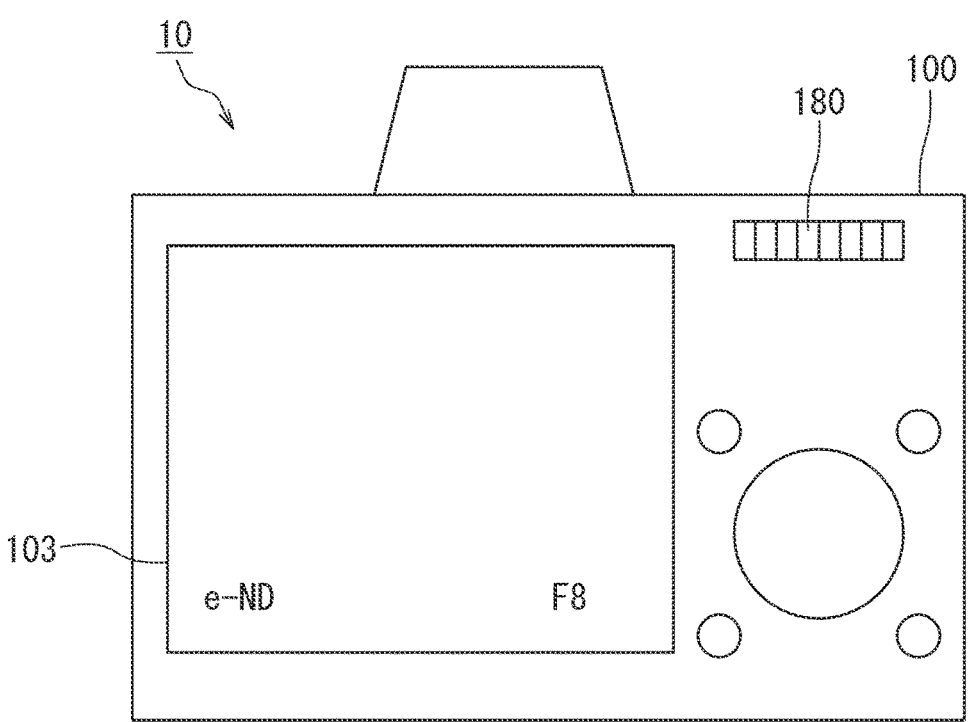
FIG. 12A is a schematic diagram of a display on a liquid crystal monitor before the warning message is displayed thereon.
Figure 12B:
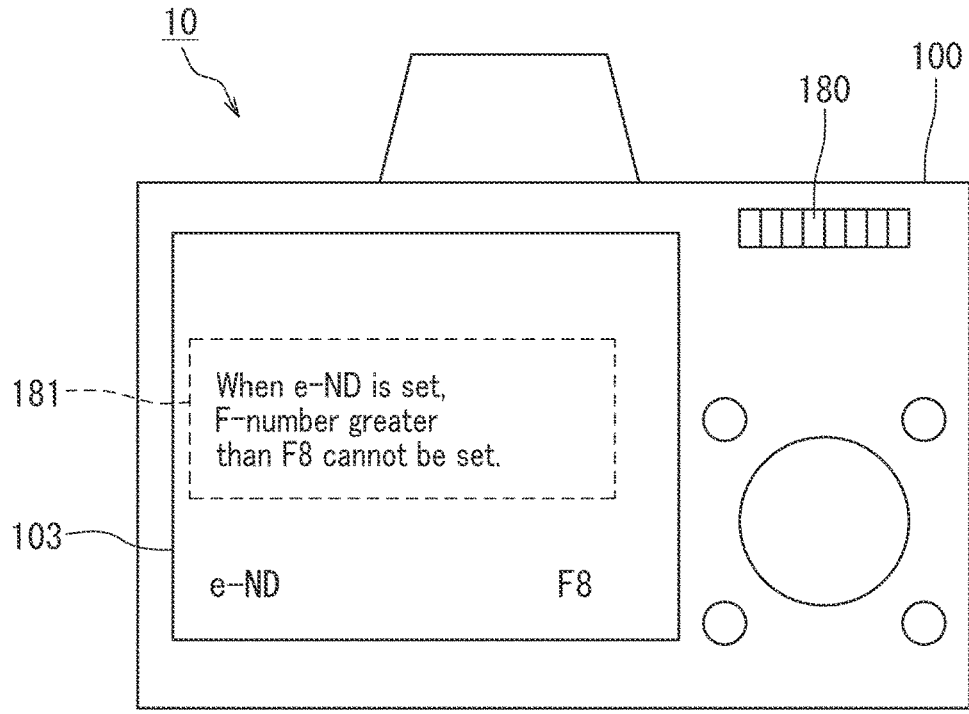
FIG. 12B is a schematic diagram of a display on the liquid crystal monitor on which the warning message is displayed.

FIG. 11 is a schematic flowchart to display a warning message. FIG. 12A is a schematic diagram of the display on the liquid crystal monitor before the warning message is displayed thereon. FIG. 12B is a schematic diagram of the display on the liquid crystal monitor on which the warning message is displayed. With the example depicted in FIGS. 11, 12A and 12B, the case where the first transmissibility state where the first optical filter 130 is used is established will be described.

As depicted in FIG. 11, at step S10, the camera controller 110 receives a command to vary the aperture value. The command to vary the aperture value is a command to increase or reduce the aperture value from the current aperture value.

In this embodiment, as depicted in FIG. 12A, an aperture value setting dial 180 and the liquid crystal monitor 103 are disposed on the back face of the camera body 100.

The aperture value setting dial 180 is a dial for setting the aperture value. For example, the aperture value can be increased by rotating the aperture value setting dial 180 in the forward direction (the right direction) and can be reduced by rotating the aperture value setting dial 180 in the reverse direction (the left direction). The user can vary the aperture value by rotating the aperture value setting dial 180. For example, the aperture value setting dial 180 is operated by being rotated and an instruction to vary the aperture value corresponding to the rotation amount of the aperture value setting dial 180 is thereby output. The camera controller 110 receives the instruction to vary the aperture value output by the operation of the aperture value setting dial 180.

The type of the currently used optical filter and the currently set aperture value (F-number) are displayed on the liquid crystal monitor 103.

Retuning back to FIG. 11, at step S11, the camera controller 110 determines whether the aperture value to be set by being varied based on the received instruction exceeds the first setting range.

In the case where the aperture value to be set by being varied exceeds the first setting range, the process advances to step S12. In the case where the aperture value to be set by being varied does not exceed the first setting range, the process comes to an end.

At step S12, the camera controller 110 causes the monitor 103 to display thereon the warning message. For example, the warning message is a sentence that expresses that any aperture value exceeding the setting range cannot be set.

In the case of this embodiment, as depicted in FIG. 12B, a warning message 181 having "when e-ND is set, F-number greater than F8 cannot be set." described therein is displayed on the liquid crystal monitor 103.

(Effects)

The imaging device 10 according to the first embodiment of the present disclosure can achieve the following effects.

The imaging device 10 of the present disclosure includes the image sensor (the imaging element) 120 and the switching mechanism 132. The image sensor 120 has the imaging plane 120a for the light from the object to enter. The switching mechanism 132 switches the transmissibility state to the first transmissibility state or the second transmissibility state that is different from the first transmissibility state, by varying the transmissibility of the light entering the imaging plane 120a, using the optical filters 130 and 131. The imaging device 10 includes the camera controller (the processor) 110 and the flash memory (the memory) 111. The camera controller 110 controls the image sensor 120 and the switching mechanism 132. The flash memory 111 stores therein the instructions to be executed by the camera controller 110. The instructions include determining whether the first transmissibility state or the second transmissibility state is established. The instructions include acquiring the first setting range that indicates the aperture value of the diaphragm 230 settable in the first transmissibility state in the case where it is determined that the first transmissibility state is established, and acquiring the second setting range that indicates the aperture value settable in the second transmissibility state in the case where it is determined that the second transmissibility state is established. The instructions also include limiting the aperture value based on the first setting range or the second setting range.

Due the above configuration, the aperture value of the diaphragm 230 can be limited in response to the switching of the transmissibility state of the light using the optical filters 130 and 131. For example, the setting range of the settable aperture value can be varied in response to the switching of the transmissibility state of the light. The aperture value can thereby be limited to the one with which any blemish, any hole, or any foreign object on each of the optical filters 130 and 131 does not appear in the image when the imaging is executed. As a result, even in the case where a blemish, a hole, or a foreign object is present on each of the optical filters 130 and 131, a still image or a moving image having high quality can be imaged.

Because the setting range of the aperture value can be varied in response to the switching of the transmissibility state of the light, a merit is present that the cost of the device becomes relatively inexpensive. To manufacture the optical filters 130 and 131 each having high quality and each having thereon no blemish and no hole is difficult because of problems in the manufacture, and tends to need a high cost. According to the imaging device 10 of the present disclosure, the aperture value is set in the setting range that limits the aperture value such that any blemish, any hole, or any foreign object of each of the filters does not appear in the image when the imaging is executed. Appearance of any blemish, any hole, or any foreign object of each of the filters in the image can therefore be suppressed even in the case where relatively inexpensive optical filters whose quality is not so high are used.

The switching mechanism 132 includes the driving mechanisms 160 and 161 that cause the optical filters 130 and 131 to pivot each between the filtering position and the retreat position. The filtering position is the position at which each of the optical filters 130 and 131 is positioned in front of the imaging plane 120a of the image sensor 120 and at which the light before arriving at the imaging plane 120a is transmitted through each of the optical filters 130 and 131. The retreat position is the position at which the optical filters 130 and 131 are each away from the position in front of the imaging plane 120a. Due to the above configuration, the first transmissibility state and the second transmissibility state can be switched therebetween by causing the optical filters 130 and 131 to pivot each between the filtering position and the retreat position.

The optical filters include the first optical filter 130 and the second optical filter 131 that is different from the first optical filter. The driving mechanisms 160 and 161 respectively cause the first optical filter 130 to pivot between the first filtering position and the first retreat position, and the second optical filter 131 to pivot between the second filtering position and the second retreat position. In the case where the first transmissibility state is established, the first optical filter 130 is placed at the first filtering position and the second optical filter 131 is placed at the second retreat position. In the case where the second transmissibility state is established, the first optical filter 130 is placed at the first retreat position and the second optical filter 131 is placed at the second filtering position. Due to the above configuration, the first transmissibility state and the second transmissibility state can easily be switched therebetween by causing the first and the second optical filters 130 and 131 to pivot between the first and the second filtering positions, and the first and the second retreat positions.

The first optical filter 130 is the electronic filter whose transmissibility is variable, and the second optical filter 131 is the filter whose transmissibility is fixed. For example, an electronic ND filter is configured to sandwich therein a liquid crystal material between plural glass pieces and, when mechanical polishing is executed for the glass surface of the filter, a load is applied to the liquid crystal material by the processing pressure and a blemish and the like tend to be generated. In the electronic ND filter, a blemish or a hole formed on the filter may therefore tend to appear in the image when the imaging is executed, depending on the setting range of the aperture value. According to the imaging device 10 of the present disclosure, even for a filter on which a blemish or a hole tends to be generated such as the electronic ND filter, a setting range can be set that limits the aperture value such that any blemish, any hole, or any foreign object of the filter does not appear in the image when the imaging is executed. As a result, a still image or a moving image having high quality can be imaged.

The first filtering position is farther from the imaging plane 120*a* of the image sensor 120 than the second filtering position is. A blemish, a hole, and/or a foreign object present on the filter tend(s) to more easily appear in the image as the filter becomes closer to the imaging plane 120*a*. As above, an electronic filter tends to have a blemish and a hole formed thereon. Appearance of any blemish, any hole, or any foreign object present on the filter therefore tends to be suppressed when the imaging is executed, by placing the electronic filter farther than the imaging plane 120*a*.

The upper limit value of the aperture value in the first setting range is smaller than the upper limit value of the aperture value in the second setting range. Due to the above configuration, appearance of any blemish, any hole, or any foreign object present on the filter can further be suppressed when the imaging is executed.

The imaging device 10 includes the detection mechanism 133 that detects the first transmissibility state and the second transmissibility state. To determine whether the first transmissibility state or the second transmissibility state is established includes detection of the first transmissibility state and the second transmissibility state by the detection mechanism 133. Due to the above configuration, the first transmissibility state and the second transmissibility state can easily be detected.

The imaging device 10 includes the liquid crystal monitor 103 that displays thereon the information on the aperture value. The instructions include receiving a command to vary the aperture value, and to display the warning message 181 on the liquid crystal monitor 103 in the case where the aperture value after being varied exceeds the first setting range or the second setting range. Due to the above configuration, the warning message 181 can be displayed in the case where the aperture value is limited. The user can thereby easily learn that the aperture value is limited.

The control method, a program, and a computer-readable storage medium of an imaging device according to the first embodiment each achieve the same effects as the effects of the above imaging device 10.

Embodiment 2

An imaging device of the second embodiment according to the present disclosure will be described.

In the second embodiment, points different from the first embodiment will mainly be described. In the second embodiment, the identical or equivalent configuration as that of the first embodiment will be described with the same reference numeral given thereto.

Figure 13:
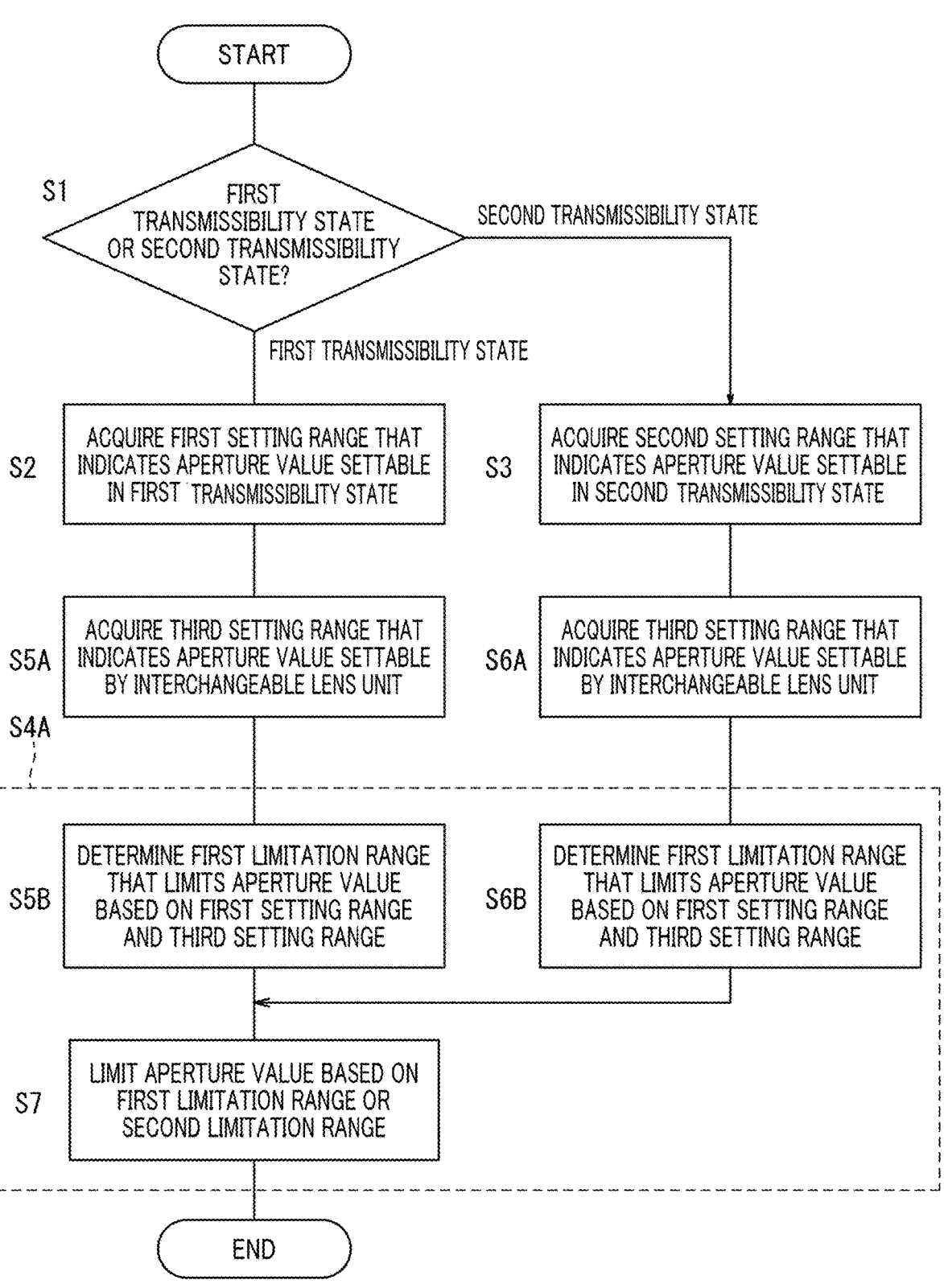
FIG. 13 is a schematic flowchart of a control method of an imaging device according to a second embodiment of the present disclosure.

FIG. 13 is a schematic flowchart of a control method of the imaging device according to the second embodiment of the present disclosure.

The second embodiment differs from the first embodiment in that the aperture value is limited based on a setting range of the aperture value settable by the interchangeable lens unit 200 in addition to the transmissibility state.

In FIG. 13, steps S1 to S3 are same as those of the first embodiment and will not therefore be described in detail.

As depicted in FIG. 13, at step S1, the camera controller 110 determines whether the first transmissibility state or the second transmissibility state is established. In the case where the camera controller 110 determines that the first transmissibility state is established, the process advances to step S2. In the case where the camera controller 110 determines that the second transmissibility state is established, the process advances to step S3.

The case where the camera controller 110 determines that a first transmission state is established will first be described.

At step S2, the camera controller 110 acquires the first setting range that indicates the aperture value settable in the first transmissibility state.

At step S5A, the camera controller 110 acquires a third setting range that indicates the aperture value settable by the interchangeable lens unit 200. The third setting range is a range of the p\perture value that is set for each interchangeable lens unit 200 attached to the camera body 100. The interchangeable lens unit 200 has a settable aperture value range that is different depending on the type of the lens.

For example, the lens controller 210 reads the third setting range that indicates the settable aperture value included in the lens data stored in the flash memory 212, and transmits the third setting range to the camera controller 110. The camera controller 110 acquires the third setting range from the lens controller 210.

At step S5B, the camera controller 110 determines a first limitation range that limits the aperture value based on the first setting range and the third setting range. For example, the camera controller 110 compares the first setting range and the third setting range with each other, and determines the first limitation range such that the setting range of the aperture value becomes smallest.

For example, in the case where the first setting range is from F-open to F8 and the third setting range is from F-open to F5.6, the camera controller 110 determines the first limitation range to be from F-open to F5.6. Otherwise, in the case where the first setting range is from F-open to F8 and the third setting range is from F-open to F11, the camera controller 110 determines the first limitation range to be from F-open to F8.

The case where the camera controller 110 determines that a second transmission state is established will next be described.

At step S3, the camera controller 110 acquires the second setting range that indicates the aperture value settable in the second transmissibility state.

At step S6A, similar to step SSA, the camera controller 110 acquires the third setting range that indicates the aperture value settable by the interchangeable lens unit 200.

At step S6B, the camera controller 110 determines a second limitation range that limits the aperture value, based on the second setting range and the third setting range. For example, the camera controller 110 compares the second setting range and the third setting range with each other and determines the second limitation range for the setting range of the aperture value to be smallest.

For example, in the case where the second setting range is from F-open to F22 and the third setting range is from F-open to F16, the camera controller 110 determines the second limitation range to be from F-open to F16. Otherwise, in the case where the second setting range is from F-open to F22 and the third setting range is from F-open to F22, the camera controller 110 determines the second limitation range to be from F-open to F22.

At step S7, the camera controller 110 limits the aperture value based on the first limitation range or the second limitation range. For example, in the case where the first transmissibility state is established, the camera controller 110 limits the aperture value based on the first limitation range. In the case where the second transmissibility state is established, the camera controller 110 limits the aperture value based on the second limitation range.

Steps S6A, S6B, and S7 are included in step S4A that corresponds to step S4 to limit the aperture value in the first embodiment.

(Effects)

The imaging device 10 according to the second embodiment of the present disclosure can achieve the following effects.

In the imaging device 10 of the present disclosure, the instructions to be executed by the camera controller 110 include acquiring the third setting range that indicates the aperture value of the diaphragm 230 settable by the interchangeable lens unit 200. The instructions include determining the first limitation range that limits the aperture value, based on the first setting range and the third setting range in the case where the first transmissibility state is established. The instructions include determining the second limitation range that limits the aperture value, based on the second setting range and the third setting range in the case where the second transmissibility state is established. The instructions include limiting the aperture value based on the first limitation range or the second limitation range.

Due to the above configuration, the aperture value can be limited based on the third setting range settable by the interchangeable lens unit 200 in addition to the first and the second setting ranges settable in the transmissibility state. For example, the camera controller 110 compares the first or the second setting range, and the third setting range with each other and can thereby limit the aperture value using the stricter setting. The limitation of the aperture value can thereby be determined corresponding also to the type of the interchangeable lens unit 200.

As above, the embodiments have been described as exemplification of the technique in the present disclosure. The drawings and the detailed description are therefore provided. The constituent elements depicted and described in the drawings and the detailed description may include not only the constituent elements essential for solving the problem but also the constituent elements not essential for solving the problem but to exemplify the above technique. Those constituent elements that are not essential should not readily be recognized as essential constituent elements based on the fact that those constituent elements that are not essential are depicted and described in the drawings and the detailed description.

Because the above embodiments are to exemplify the technique of the present disclosure, various changes, substitutions, additions, omissions, and the like can be made to the embodiments within the scope of the claims or a scope equivalent thereto.

The above embodiments may each be realized by a device, a system, a method, a computer program, a computer-readable storage medium, and a combination thereof.

The example where the first optical filter 130 is an electronic filter whose transmissibility is variable and the second optical filter 131 is clear glass whose transmissibility is fixed has been described in the above embodiments while the optical filters are not limited to the above. For example, the first and the second optical filters 130 and 131 may each be selected from an electronic filter, clear glass, and a glass element. The glass element is glass whose transmissibility is smaller than that of clear glass and is constant. For example, the glass element may be an ND filter whose transmissibility is fixed.

The example where the first transmissibility state is the state where the electronic filter is positioned at the first filtering position and the second transmissibility state is the state where the clear glass is positioned at the second filtering position has been described in the above embodiments while the transmissibility states are not limited to the above. For example, the first transmissibility state may be the state where a glass element or clear glass is positioned at the first filtering position. The second transmissibility state may be the state where a glass element or an electronic filter is positioned at the second filtering position.

The example where the imaging device 10 includes the two optical filters 130 and 131 has been described in the above embodiments while the optical filters are not limited to the above. The imaging device 10 may include one or more optical filter(s). For example, in the case where the imaging device 10 includes one electronic filter, the first transmissibility state may be the state where the electronic filter is positioned at the first filtering position. The second transmissibility state may be the state where the electronic filter is positioned at the first retreat position. The second transmissibility state may be the state where the light directly enters the imaging plane 120a without passing through the optical filter.

The example where the switching mechanism 132 is realized by the rack and pinion mechanism of each of the first and the second driving mechanism 160 and 161 has been described in the above embodiments while the switching mechanism is not limited to the above. For example, the switching mechanism 132 may be realized by other driving mechanisms.

The example where the detection mechanism 133 detects the transmissibility state based on the presence or the absence of the electric connection of the first to the fourth electric contacts 170, 171, 173, and 174 has been described in the above embodiments while the detection is not limited to the above. For example, the detection mechanism 133 may detect the transmissibility state by detecting the positions of the optical filters 130 and 131 using push-switches, capacitance sensors, magnetic sensors, or the like.

The example where the camera controller 110 executes the processes has been described in the above embodiments while the execution of the processes is not limited to the above. For example, at least a portion of the above processes may be executed by the lens controller 210.

The example where the interchangeable lens unit 200 is used has been described in the above embodiments while the imaging device 10 is not limited to the above. For example, the imaging device 10 may be a lens incorporated camera that has a lens unit and the camera body 100 integrated therein.

The example where the camera controller 110 limits the aperture value (the F-number) of the diaphragm 230 corresponding to the first and the second transmissibility states has been described in the above embodiments while the limitation is not limited to the above. For example, the camera controller 110 may limit the range of the focus corresponding to the first and the second transmissibility states. The focus means the imaging distance for which the image can be brought into focus.

Figure 14:
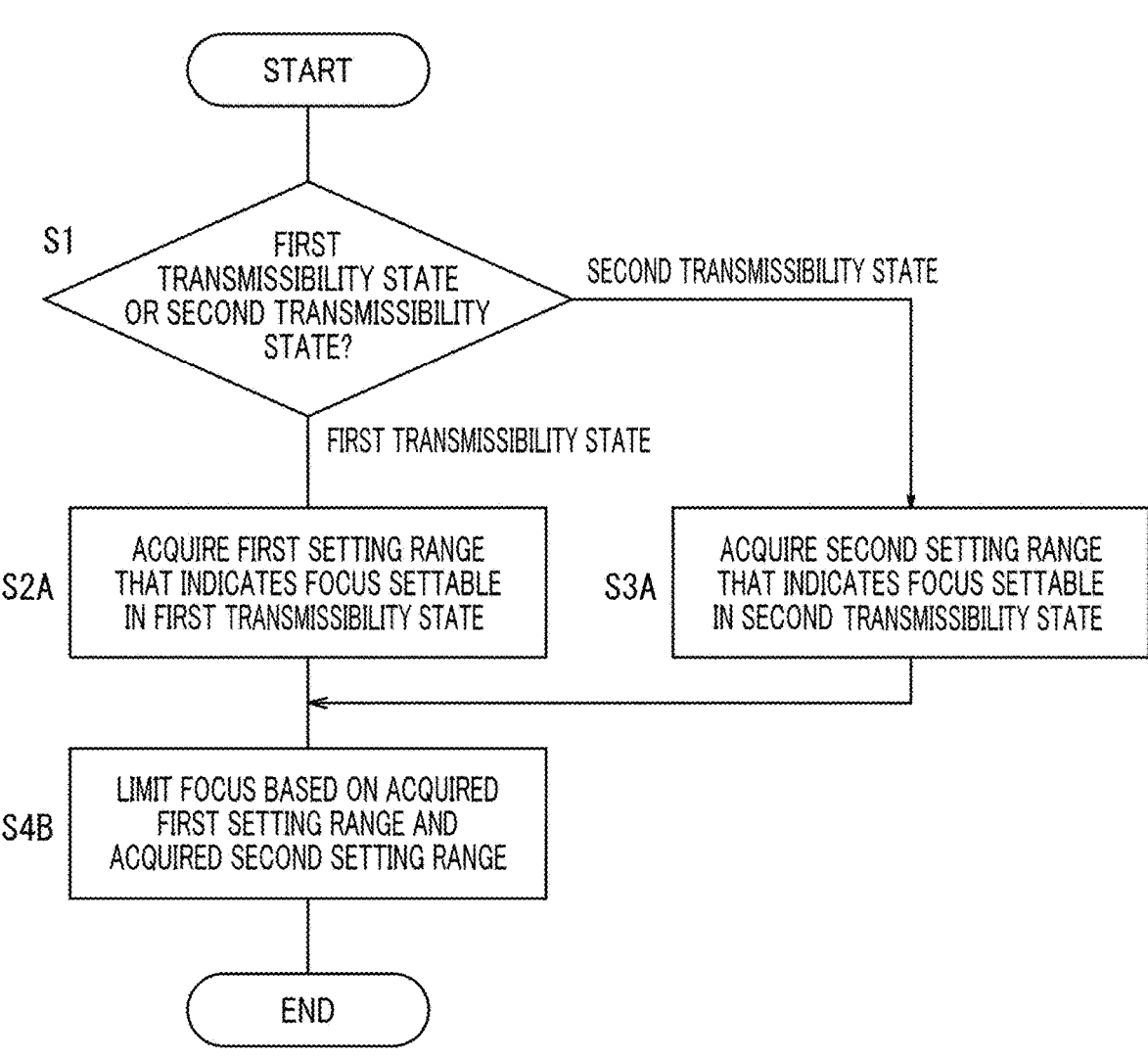
FIG. 14 is a schematic flowchart of a control method of an imaging device according to a first variant.

FIG. 14 is a schematic flowchart of a control method of an imaging device according to a first variant.

As depicted in FIG. 14, at step S1, the camera controller 110 determines whether the first transmissibility state or the second transmissibility state is established. In the case where the camera controller 110 determines that the first transmissibility state is established, the process advances to step S2A. In the case where the camera controller 110 determines that the second transmissibility state is established, the process advances to step S3A.

At step S2A, the camera controller 110 acquires a first setting range that indicates the focus settable in the first transmissibility state. The first setting range is stored in the flash memory 111. The camera controller 110 acquires the first setting range from the flash memory 111.

The first setting range is the setting range of the focus with which any blemish, any hole, or any foreign object on the filter surface of the first optical filter 130 does not appear in the image when the imaging is executed using the first optical filter 130. In this variant, the first optical filter 130 is an electronic ND filter. For example, in the case where the interchangeable lens unit 200 is a lens whose closest focusing distance is 300 mm, the first setting range is set to be in a range from INF to 550 mm.

At step S3A, camera controller 110 acquires a second setting range that indicates the focus settable in the second transmissibility state. The second setting range is stored in the flash memory 111. The camera controller 110 acquires the second setting range from the flash memory 111.

The second setting range is the setting range of the focus with which any blemish, any hole, or any foreign object on the filter surface of the second optical filter 131 does not appear in the image when the imaging is executed using the second optical filter 131. In this variant, the second optical filter 131 is clear glass whose transmissibility is substantially 100%. For example, in the case where the interchangeable lens unit 200 is a lens whose closest focusing distance is 300 mm, the second setting range is set to be a range from INF to 300 mm.

At step S4B, the camera controller 110 limits the focus based on the first setting range or the second setting range, that is acquired. For example, the camera controller 110 limits the focus such that the focus does not exceed the first setting range or the second setting range.

For example, in the case where the first setting range is set to be a range from INF to 550 mm at step S2A, the camera controller 110 limits such that no focus exceeding 550 mm can be set.

Figure 15:
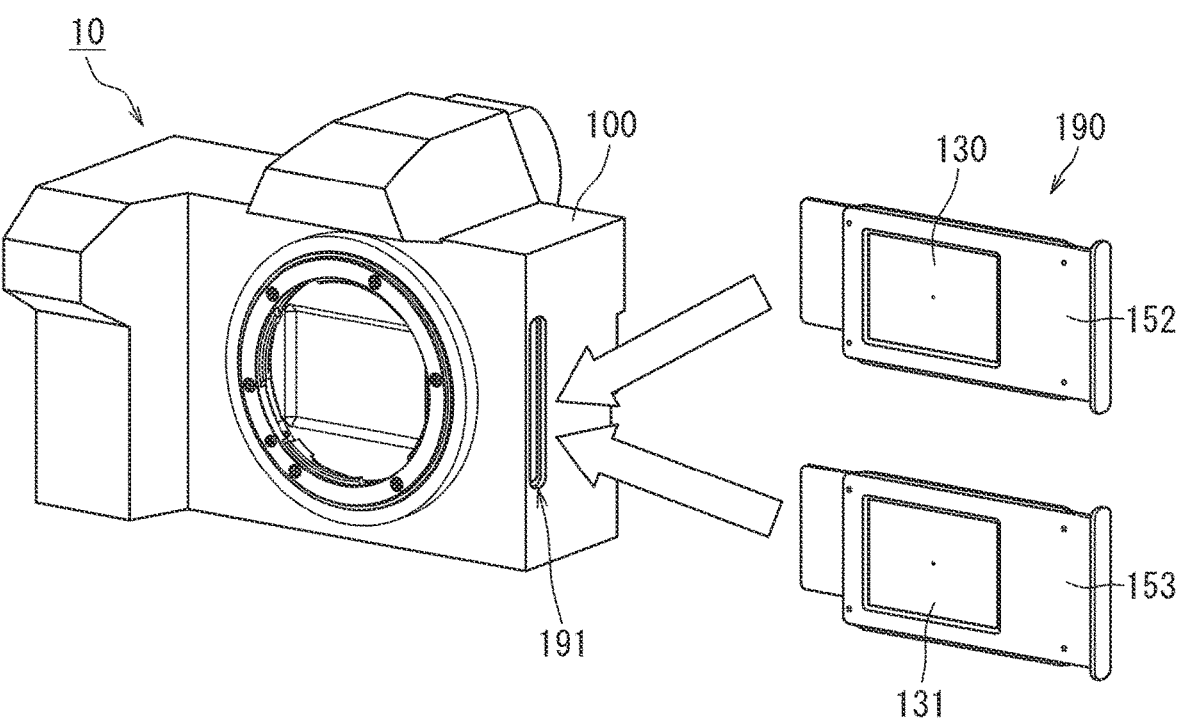
FIG. 15 is a schematic diagram for explaining an imaging device according to a second variant.

FIG. 15 is a schematic diagram for explaining an imaging device according to a second variant.

As depicted in FIG. 15, the second variant differs from the first embodiment in that the switching mechanism 132 includes an insertion mechanism 190 that inserts the first and the second optical filters 130 and 131 into a filtering position. Other configurations in the second variant are same as the configurations of the imaging device 10 in the first embodiment.

The insertion mechanism 190 inserts the first and the second optical filters 130 and 131 into the filtering position. The insertion mechanism 190 can insert the first and the second filter units 152 and 153 respectively having the first and the second optical filters 130 and 131 disposed thereon, into the filtering position.

The camera body 100 of the imaging device 10 has an insertion slot 191 disposed thereon, into which the first filter unit 152 or the second filter unit 153 can be inserted. The first filter unit 152 or the second filter unit 153 is placed in the imaging device 10 passing through the insertion slot 191.

The first optical filter 130 or the second optical filter 131 is thereby placed at the filtering position.

The first filter unit 152 and the second filter unit 153 can be taken out from the insertion slot 191 after being inserted into the insertion slot 191. The first optical filter 130 and the second optical filter 131 can thereby be placed at the filtering position and can be retreated from the filtering position.

In the second variant, either one of the first filter unit 152 and the second filter unit 153 is inserted into the insertion slot 191. When the first filter unit 152 is inserted into the insertion slot 191, the first optical filter 130 is therefore placed at the filtering position. When the second filter unit 153 is inserted into the insertion slot 191, the second optical filter 131 is placed at the filtering position. The first filter unit 152 and the second filter unit 153 are each inserted and taken out, and the first optical filter 130 and the second optical filter 131 are thereby each placed at the same filtering position.

The insertion mechanism 190 may include a positioning mechanism that positions the first optical filter 130 or the second optical filter 131 at the filtering position. The positioning mechanism includes, for example, a hole and a protrusion for positioning.

The insertion mechanism 190 may include a rail or a guide on which the first filter unit 152 and the second filter unit 153 can be moved by sliding.

In the insertion mechanism 190, the first optical filter 130 and the second optical filter 131 may be placed each at a filtering position different from that of each other. For example, in the insertion mechanism 190, the first optical filter 130 may be inserted into the first filtering position and the second optical filter 131 may be inserted into the second filtering position that is different from the first filtering position. The first filtering position may be farther from the imaging plane of the imaging element than the second filtering position is. For example, the insertion mechanism 190 may have a first insertion slot into which the first filter unit 152 can be inserted and a second insertion slot into which the second filter unit 153 can be inserted, disposed thereon. The second insertion slot is disposed to be farther from the imaging plane of the imaging element compared to the first insertion slot.

The technique of the above embodiments is applicable also to variants. For example, in variants, the warning message indicating that the focus is limited may be displayed on the liquid crystal monitor 103.

The above embodiments and variants can each be combined with each other. For example, the imaging device 10 may limit the aperture value and/or the focus based on the setting range of the aperture value and/or the focus settable corresponding to the transmissibility state.

(Summary of the Embodiments)

(1) An imaging device of the present disclosure includes:
an imaging element having an imaging plane for light from an object to enter;
a switching mechanism that switches the state between a first transmissibility state and a second transmissibility state by varying transmissibility for the light entering the imaging plane using optical filters, the second transmissibility state being different from the first transmissibility state;
a processor that controls the imaging element and the switching mechanism; and
a memory that stores therein instructions to be executed by the processor, wherein

25 the instructions include:

determining whether the first transmissibility state or the second transmissibility state is established;

in a case where the first transmissibility state is established, acquiring a first setting range that indicates an aperture value or a focus settable in the first transmissibility state;

in a case where the second transmissibility state is established, acquiring a second setting range that indicates an aperture value or a focus settable in the second transmissibility state; and limiting the aperture value or the focus based on the first setting range or the second setting range.

(2) In the imaging device of (1), the switching mechanism may include a driving mechanism that causes the optical filters to each pivot between a filtering position and a retreat position, the filtering position may be a position at which the optical filters are each placed in front of the imaging plane of the imaging element and at which the light before arriving at the imaging plane is transmitted through either one of the optical filters, and the retreat position may be a position at which the optical filters are each away from a position in front of the imaging plane.

(3) In the imaging device of (2), the optical filters may include:

a first optical filter, and a second optical filter that is different from the first optical filter, the driving mechanism may cause the first optical filter to pivot between a first filtering position and a first retreat position, and may cause the second optical filter to pivot between a second filtering position and a second retreat position, in the case where the first transmissibility state is established, the first optical filter may be placed at the first filtering position and the second optical filter may be placed at the second retreat position, and in the case where the second transmissibility state is established, the first optical filter may be placed at the first retreat position and the second optical filter may be placed at the second filtering position.

(4) In the imaging device of (3), the first optical filter may be an electronic filter whose transmissibility is variable, and the second optical filter may be a filter whose transmissibility is fixed.

(5) In the imaging device of (4), the first filtering position may be farther from the imaging plane of the imaging element than the second filtering position is.

(6) In the imaging device of (4) or (5), an upper limit value of an aperture value in the first setting range may be smaller than an upper limit value of an aperture value in the second setting range.

(7) The imaging device of any one of (1) to (6) may further comprise a lens unit, wherein the instructions may further include acquiring a third setting range that indicates an aperture value or a focus settable by the lens unit, and wherein the limiting the aperture value or the focus may include:

in the case where the first transmissibility state is established, determining a first limitation range that limits the aperture value or the focus based on the first setting range and the third setting range;

26 in the case where the second transmissibility state is established, determining a second limitation range that limits the aperture value or the focus based on the second setting range and the third setting range; and limiting the aperture value and the focus based on the first limitation range and the second limitation range.

(8) The imaging device of any one of (1) to (6) may further include a detection mechanism that detects the first transmissibility state and the second transmissibility state, wherein the determining the first transmissibility state or the second transmissibility state is established may include detecting the first transmissibility state and the second transmissibility state using the detection mechanism.

(9) The imaging device of (1) to (7) may further comprise a monitor that displays information on the aperture value or the focus, wherein the instructions may include:

receiving a command to vary the aperture value or the focus; and displaying a warning message on the monitor in a case where an aperture value or a focus after being varied exceeds the first setting range or the second setting range.

(10) In the imaging device of (1), the switching mechanism may include an insertion mechanism that inserts and takes out the optical filters each at a filtering position, and the filtering position may be a position at which the optical filters are each placed in front of the imaging plane of the imaging element and at which the light before arriving at the imaging plane is transmitted through either one of the optical filters.

(11) In the imaging device of (10), the optical filters may include:

a first optical filter; and a second optical filter that is different from the first optical filter, and the insertion mechanism may insert at least one of the first optical filter and the second optical filter, into the filtering position.

(12) In the imaging device of (10) or (11), the first optical filter may be an electronic filter whose transmissibility is variable, and the second optical filter may be a filter whose transmissibility is fixed.

(13) In the imaging device of (12), the insertion mechanism may insert the first optical filter into a first filtering position, and may insert the second optical filter into a second filtering position that is different from the first filtering position, and the first filtering position may be farther from the imaging plane of the imaging element than the second filtering position is.

(14) In a control method of an imaging device including: an imaging element having an imaging plane for light from an object to enter; and a switching mechanism that switches a first transmissibility state and a second transmissibility state different from the first transmissibility state, therebetween by varying transmissibility for the light entering the imaging plane, using optical filters, the control method may include:

determining whether the first transmissibility state or the second transmissibility state is established;

in a case where the first transmissibility state is established, acquiring a first setting range that indicates an aperture value or a focus settable in the first transmissibility state;

in a case where the second transmissibility state is established, acquiring a second setting range that indicates an aperture value or a focus settable in the second transmissibility state; and limiting the aperture value or the focus based on the first setting range or the second setting range.

(15) In the control method of (14), the switching mechanism may include a driving mechanism that causes the optical filters to each pivot between a filtering position and a retreat position, the filtering position may be a position at which the optical filters are each placed in front of the imaging plane of the imaging element and at which the light before arriving at the imaging plane is transmitted through either one of the optical filters, and the retreat position may be a position at which the optical filters are each away from a position in front of the imaging plane.

(16) In the control method of (15), the optical filters may include:

a first optical filter; and a second optical filter that is different from the first optical filter, wherein the control method further may include:

causing the first optical filter to pivot between a first filtering position and a first retreat position, and causing the second optical filter to pivot between a second filtering position and a second retreat position, in the first transmissibility state, the first optical filter may be placed at the first filtering position and the second optical filter is placed at the second retreat position, and in the second transmissibility state, the first optical filter may be placed at the first retreat position and the second optical filter is placed at the second filtering position.

(17) In the control method of (16), the first optical filter may be an electronic filter whose transmissibility is variable, and wherein the second optical filter may be a filter whose transmissibility is fixed.

(18) In the control method of (17), the first filtering position may be farther from the imaging plane of the imaging element than the second filtering position is.

(19) In the control method of (17) or (18), an upper limit value of an aperture value in the first setting range may be smaller than an upper limit value of an aperture value in the second setting range.

(20) A computer-readable storage medium stores therein instructions that causes a processor to execute the control method of (14).

What is claimed is:

1. An imaging device comprising:

a lens unit;

an imaging element having an imaging plane for light from an object to enter;

a switching mechanism that switches a first transmissibility state and a second transmissibility state therebetween by varying transmissibility for the light entering the imaging plane using optical filters, the second transmissibility state being different from the first transmissibility state;

a processor that controls the imaging element and the switching mechanism; and a memory that stores therein instructions to be executed by the processor, wherein the instructions comprise:

determining whether the first transmissibility state or the second transmissibility state is established;

in a case where the first transmissibility state is established, acquiring a first setting range that indicates an aperture value or a focus settable in the first transmissibility state;

in a case where the second transmissibility state is established, acquiring a second setting range that indicates an aperture value or a focus settable in the second transmissibility state; and limiting the aperture value or the focus based on the first setting range or the second setting range; and further comprising:

acquiring a third setting range that indicates an aperture value or a focus settable by the lens unit, and wherein the limiting the aperture value or the focus comprises:

in the case where the first transmissibility state is established, determining a first limitation range that limits the aperture value or the focus based on the first setting range and the third setting range;

in the case where the second transmissibility state is established, determining a second limitation range that limits the aperture value or the focus based on the second setting range and the third setting range; and limiting the aperture value and the focus based on the first limitation range and the second limitation range.

2. The imaging device according to claim 1, wherein the switching mechanism comprises a driving mechanism that causes the optical filters to each pivot between a filtering position and a retreat position, wherein the filtering position is a position at which the optical filters are each placed in front of the imaging plane of the imaging element and at which the light before arriving at the imaging plane is transmitted through either one of the optical filters, and wherein the retreat position is a position at which the optical filters are each away from a position in front of the imaging plane.

3. The imaging device according to claim 2, wherein the optical filters comprise:

a first optical filter; and a second optical filter that is different from the first optical filter, wherein the driving mechanism causes the first optical filter to pivot between a first filtering position and a first retreat position, and causes the second optical filter to pivot between a second filtering position and a second retreat position, wherein in the first transmissibility state, the first optical filter is placed at the first filtering position and the second optical filter is placed at the second retreat position, and wherein in the second transmissibility state, the first optical filter is placed at the first retreat position and the second optical filter is placed at the second filtering position.

4. The imaging device according to claim 3, wherein the first optical filter is an electronic filter whose transmissibility is variable, and wherein the second optical filter is a filter whose transmissibility is fixed.

5. The imaging device according to claim 4, wherein the first filtering position is farther from the imaging plane of the imaging element than the second filtering position is.

6. The imaging device according to claim 4, wherein an upper limit value of an aperture value in the first setting range is smaller than an upper limit value of an aperture value in the second setting range.

7. The imaging device according to claim 1, further comprising a detection mechanism that detects the first transmissibility state and the second transmissibility state, wherein the determining whether the first transmissibility state or the second transmissibility state is established comprises detecting the first transmissibility state and the second transmissibility state using the detection mechanism.

8. The imaging device according to claim 1, further comprising a monitor that displays information on the aperture value or the focus, wherein the instructions comprise:

receiving a command to vary the aperture value or the focus; and displaying a warning message on the monitor in a case where an aperture value or a focus after being varied exceeds the first setting range or the second setting range.

9. The imaging device according to claim 1, wherein the switching mechanism comprises an insertion mechanism that inserts and takes out the optical filters each at a filtering position, and wherein the filtering position is a position at which the optical filters are each placed in front of the imaging plane of the imaging element and at which the light before arriving at the imaging plane is transmitted through either one of the optical filters.

10. The imaging device according to claim 9, wherein the optical filters comprise:

a first optical filter; and a second optical filter that is different from the first optical filter, wherein the insertion mechanism inserts at least one of the first optical filter and the second optical filter, into the filtering position.

11. The imaging device according to claim 10, wherein the first optical filter is an electronic filter whose transmissibility is variable, and wherein the second optical filter is a filter whose transmissibility is fixed.

12. The imaging device according to claim 11, wherein the insertion mechanism inserts the first optical filter into a first filtering position, and inserts the second optical filter into a second filtering position that is different from the first filtering position, and wherein the first filtering position is farther from the imaging plane of the imaging element than the second filtering position is.

13. A control method of an imaging device including a lens unit; an imaging element having an imaging plane for light from an object to enter; and a switching mechanism that switches a first transmissibility state and a second transmissibility state different from the first transmissibility state, therebetween by varying transmissibility for the light entering the imaging plane, using optical filters, the control method comprising:

determining whether the first transmissibility state or the second transmissibility state is established;

in a case where the first transmissibility state is established, acquiring a first setting range that indicates an aperture value or a focus settable in the first transmissibility state;

in a case where the second transmissibility state is established, acquiring a second setting range that indicates an aperture value or a focus settable in the second transmissibility state; and limiting the aperture value or the focus based on the first setting range or the second setting range; and further comprising:

acquiring a third setting range that indicates an aperture value or a focus settable by the lens unit, and wherein the limiting the aperture value or the focus comprises:

in the case where the first transmissibility state is established, determining a first limitation range that limits the aperture value or the focus based on the first setting range and the third setting range;

in the case where the second transmissibility state is established, determining a second limitation range that limits the aperture value or the focus based on the second setting range and the third setting range; and limiting the aperture value and the focus based on the first limitation range and the second limitation range.

14. The control method according to claim 13, wherein the switching mechanism comprises a driving mechanism that causes the optical filters to each pivot between a filtering position and a retreat position, wherein the filtering position is a position at which the optical filters are each placed in front of the imaging plane of the imaging element and at which the light before arriving at the imaging plane is transmitted through either one of the optical filters, and wherein the retreat position is a position at which the optical filters are each away from a position in front of the imaging plane.

15. The control method according to claim 14, wherein the optical filters comprise:

a first optical filter; and a second optical filter that is different from the first optical filter, wherein the control method further comprises:

causing the first optical filter to pivot between a first filtering position and a first retreat position, and causing the second optical filter to pivot between a second filtering position and a second retreat position, wherein in the first transmissibility state, the first optical filter is placed at the first filtering position and the second optical filter is placed at the second retreat position, and wherein in the second transmissibility state, the first optical filter is placed at the first retreat position and the second optical filter is placed at the second filtering position.

16. The control method according to claim 15, wherein the first optical filter is an electronic filter whose transmissibility is variable, and wherein the second optical filter is a filter whose transmissibility is fixed.

17. The control method according to claim 16, wherein the first filtering position is farther from the imaging plane of the imaging element than the second filtering position is.

18. The control method according to claim 16, wherein an upper limit value of an aperture value in the first setting range is smaller than an upper limit value of an aperture value in the second setting range.

19. A computer-readable storage medium storing therein instructions that causes a processor to execute the control method according to claim 13.

\* \* \* \* \*